United States Patent
Yamagiwa

(10) Patent No.: US 9,581,435 B2
(45) Date of Patent: *Feb. 28, 2017

(54) ELECTRONIC DEVICE

(71) Applicant: Funai Electric Co., Ltd., Daito, Osaka (JP)

(72) Inventor: Daisuke Yamagiwa, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/168,290

(22) Filed: May 31, 2016

(65) Prior Publication Data

US 2016/0273910 A1    Sep. 22, 2016

Related U.S. Application Data

(63) Continuation of application No. 14/231,821, filed on Apr. 1, 2014, now Pat. No. 9,372,074.

(30) Foreign Application Priority Data

Apr. 12, 2013    (JP) .................................. 2013-084058

(51) Int. Cl.
*G01B 11/14*    (2006.01)
*H04N 9/31*    (2006.01)
(Continued)

(52) U.S. Cl.
CPC .............. *G01B 11/14* (2013.01); *G03B 21/145* (2013.01); *G06F 3/0418* (2013.01);
(Continued)

(58) Field of Classification Search
CPC .......... G01B 11/14; G06F 3/042; G06F 3/041; H04N 9/31
(Continued)

(56) References Cited

U.S. PATENT DOCUMENTS 6,205,243 B1    3/2001    Migdal et al.
6,670,603 B2 *  12/2003    Shimada .............. G03B 21/008
                                                    250/235
(Continued)

FOREIGN PATENT DOCUMENTS

EP    0124098 A2    11/1984
EP    1022608 A1     7/2000
(Continued)

OTHER PUBLICATIONS

Extended European Search Report of the corresponding European Patent Application No. 14163901.3, dated Oct. 22, 2014.

*Primary Examiner* — Sang Nguyen
(74) *Attorney, Agent, or Firm* — Global IP Counselors, LLP

(57) ABSTRACT

An electronic device includes a photodetector, a notification light emitter, and a determination component. The photodetector detects reflected light of light from a projection device within a detection region, the projection device projecting the light in a projection region on a projection surface. The notification light emitter emits on the projection surface two notification lines of visible wavelength that approach each other towards the photodetector. The determination component determines that the projection region is at least partially located outside the detection region based on a detection result of the photodetector. The determination component further determines that an edge of the projection region that is located closest to the photodetector is substantially parallel to a line segment that connects ends of the two notification lines.

20 Claims, 11 Drawing Sheets

(51) Int. Cl.
*G06F 3/042* (2006.01)
*G06F 3/041* (2006.01)
*G03B 21/14* (2006.01)

(52) U.S. Cl.
CPC ......... *G06F 3/0425* (2013.01); *H04N 9/3129* (2013.01); *H04N 9/3194* (2013.01); *H04N 2201/0452* (2013.01)

(58) Field of Classification Search
USPC ............ 356/600–614, 3.01, 4.01, 5.01, 5.09; 348/46, 47, 744, 756
See application file for complete search history.

(56) References Cited

U.S. PATENT DOCUMENTS

| | | | |
|---|---|---|---|
| 8,988,662 | B1 | 3/2015 | Haskin et al. |
| 2004/0036844 | A1* | 2/2004 | Wood ..................... G06T 5/006 353/70 |
| 2004/0141156 | A1 | 7/2004 | Beardsley et al. |
| 2005/0213082 | A1 | 9/2005 | DiBernardo et al. |
| 2008/0246927 | A1 | 10/2008 | Inoue et al. |
| 2009/0128716 | A1 | 5/2009 | Nagashima et al. |
| 2011/0058109 | A1 | 3/2011 | Nishigaki et al. |
| 2011/0109886 | A1* | 5/2011 | Nakanishi ............ G03B 21/005 353/122 |
| 2011/0279827 | A1 | 11/2011 | Onishi |
| 2011/0304859 | A1 | 12/2011 | Nakanishi |
| 2012/0050479 | A1 | 3/2012 | Karaoguz et al. |
| 2012/0127484 | A1 | 5/2012 | Kiyose |
| 2012/0262553 | A1 | 10/2012 | Chen et al. |
| 2015/0029405 | A1* | 1/2015 | Yamagiwa ........... H04N 5/7408 348/744 |

FOREIGN PATENT DOCUMENTS

| | | |
|---|---|---|
| EP | 2237563 A2 | 10/2010 |
| JP | 2012-108233 A | 6/2012 |

* cited by examiner

ELECTRONIC DEVICE

CROSS-REFERENCE TO RELATED APPLICATIONS

This is a continuation application of U.S. patent application Ser. No. 14/231,821, which claims priority to Japanese Patent Application No. 2013-084058 filed on Apr. 12, 2013. The entire disclosures of U.S. patent application Ser. No. 14/231,821 and Japanese Patent Application No. 2013-084058 are hereby incorporated herein by reference.

BACKGROUND

Field of the Invention

The present invention generally relates to an electronic device. More specifically, the present invention relates to an electronic device that detects reflected light of light that has been projected.

Background Information

Projectors that project an image onto a screen, a wall, a desktop, or another such projection surface are well-known in the art. Various kinds of devices that make use of a projector are also developed (see Japanese Unexamined Patent Application Publication No. 2012-108233 (Patent Literature 1), for example.

This Patent Literature 1 discloses a projector with a VUI (Virtual User Interface). With this projector, a projector unit, a light projection unit, and a visible camera are fixedly installed inside the same housing. The projector unit projects a specific projected image onto a projection surface. The light projection unit projects light for detecting an object, such as the user's finger, located above the projection region of the projected image. The visible camera captures light reflected by the object above the projection region. The position of the object above the projected image is detected by the VUI based on this image capture result.

SUMMARY

With a projector, however, the projector unit must be kept at a constant height or higher. If the projector unit is disposed in the same housing as the visible camera as in the above-mentioned Patent Literature 1, then the installation position of the projector unit is limited, and the projector tends to become larger. Also, if the projector unit is fixed in the housing as in the above-mentioned Patent Literature 1, then the size of the image projected by the projector unit on a projection surface will be fixed by the device. Furthermore, the places where the projector can be installed are limited.

Also, even if the projector unit can be disposed away from the visible camera, the projection region of the projected image will deviate from the region in which the visible camera can detect the reflected light. This is not taken into account in the above-mentioned Patent Literature 1.

One aspect is to provide an electronic device with which reflected light of light that is projected from a projection device can be detected by a detection device even though the projection device and the detection device are disposed away from each other.

In view of the state of the known technology, an electronic device is provided that includes a photodetector, a notification light emitter, and a determination component. The photodetector detects reflected light of light from a projection device within a detection region, the projection device projecting the light in a projection region on a projection surface. The notification light emitter emits on the projection surface two notification lines of visible wavelength that approach each other towards the photodetector. The determination component determines that the projection region is at least partially located outside the detection region based on a detection result of the photodetector. The determination component further determines that an edge of the projection region that is located closest to the photodetector is substantially parallel to a line segment that connects ends of the two notification lines.

Also other objects, features, aspects and advantages of the present disclosure will become apparent to those skilled in the art from the following detailed description, which, taken in conjunction with the annexed drawings, discloses embodiments of the electronic device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment

Figure 1:
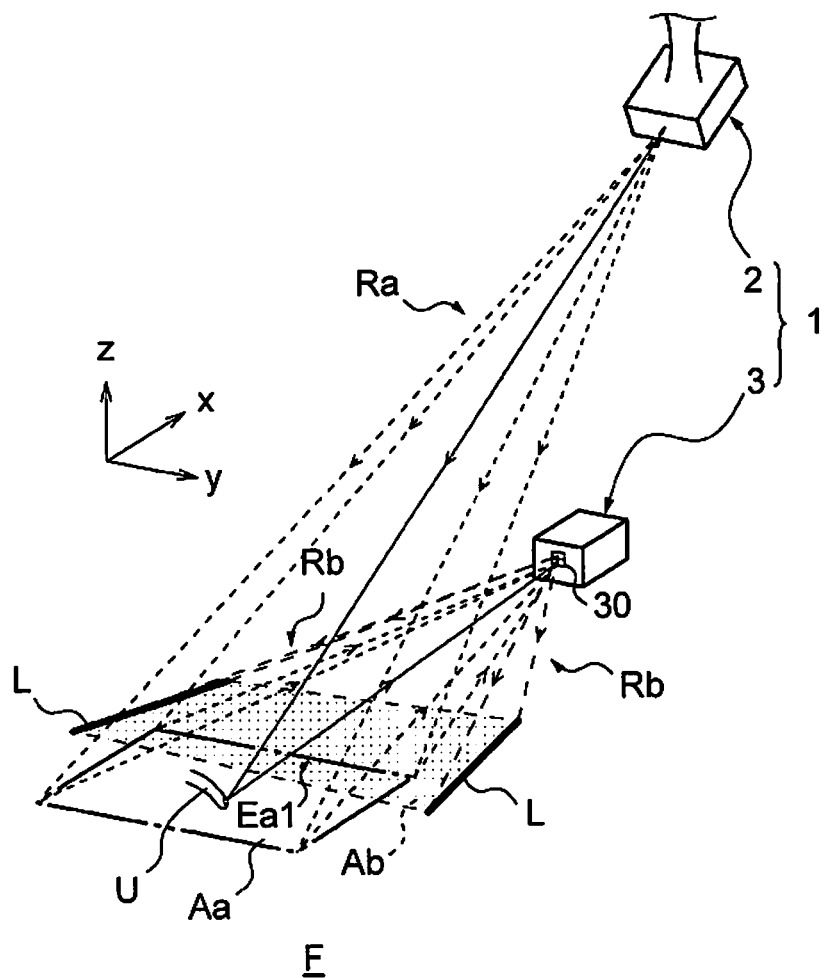
FIG. 1 is a perspective view of a projector in accordance with a first embodiment.

Referring initially to FIG. 1, a projector 1 is illustrated in accordance with a first embodiment. The projector 1 is a laser beam scanning type of projection device with a VUI (Virtual User Interface) function. The projector 1 is an example of an electronic device that can be used as an input device with its VUI function. The VUI function is a virtual input interface with which the user can make inputs to a projected image (such as an image of a keyboard or an input panel) projected onto a projection surface F.

Figure 2:
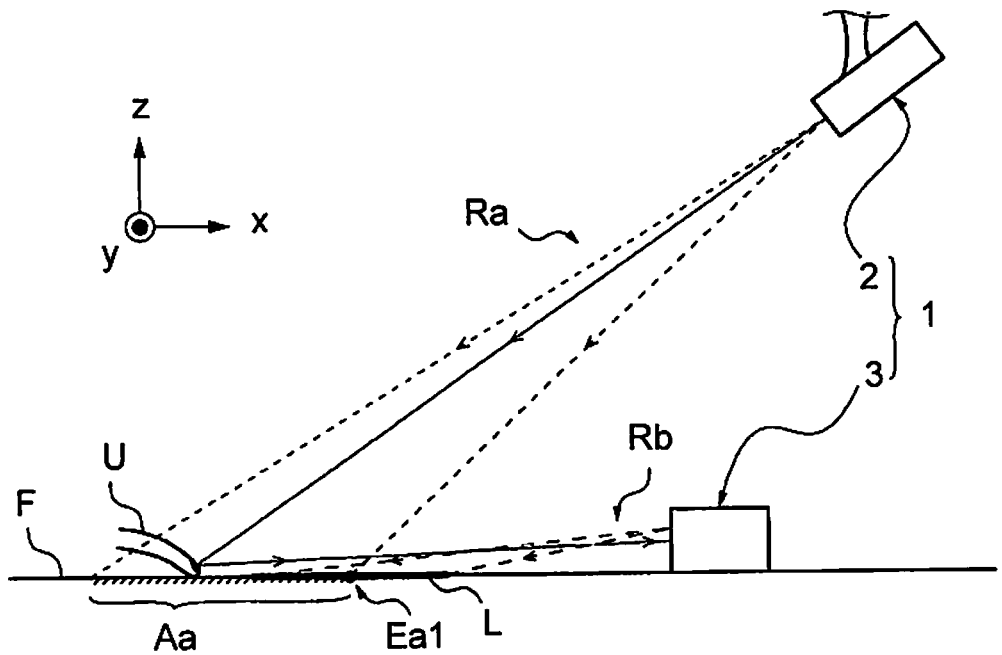
FIG. 2 is a side elevational view of the projector, illustrating the optical path of the projector.
Figure 3:
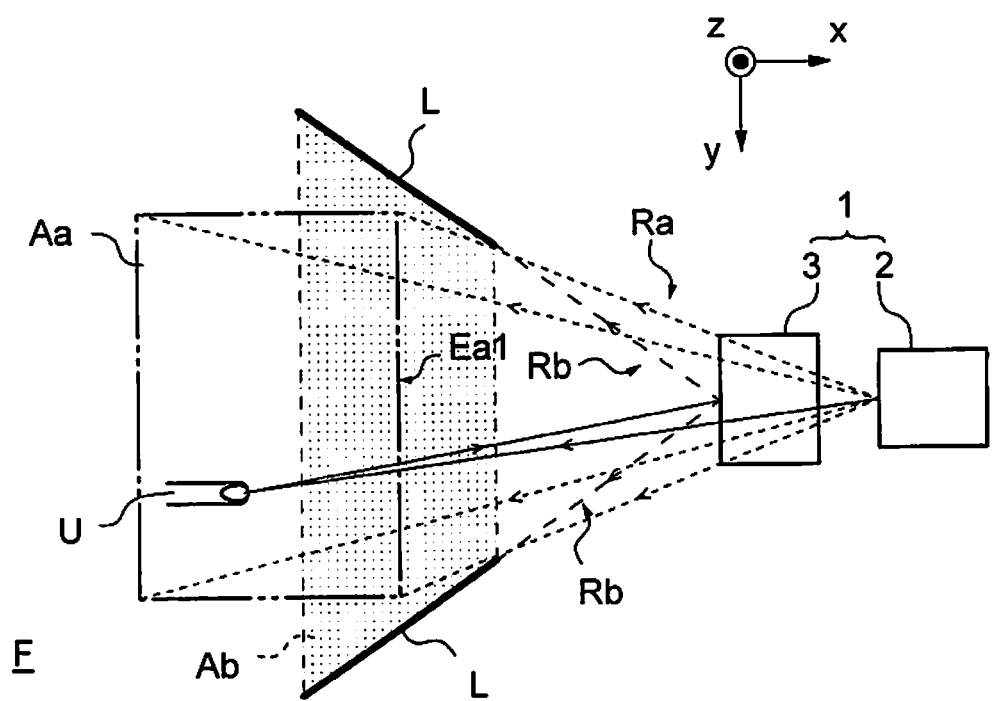
FIG. 3 is a top plan view of the projector, illustrating the optical path of the projector.

FIG. 1 is a perspective view of the appearance of the projector 1. FIG. 2 is a side elevational view illustrating the optical path of the projector 1. FIG. 3 is a top plan view illustrating the optical path of the projector 1. In the following (not just in this embodiment), the x direction and y direction refer to directions parallel to the projection surface F, while the z direction refers to the normal direction of the projection surface F. The x, y, and z directions are all perpendicular to each other. In FIGS. 2 and 3, the reflected lights of a scanning laser beam Ra and notification light Rb (discussed below) reflected by the projection surface F are not depicted, in order to facilitate an understanding of the main components.

As shown in FIGS. 1 to 3, the projector 1 includes a projector unit 2 (e.g., a projection unit) and a sensor unit 3 (e.g., a detection unit). The projector unit 2 and the sensor unit 3 are disposed independently and spaced away from each other. Specifically, the projector unit 2 and the sensor unit 3 are not built in to the same housing, and instead have separate housings. Accordingly, the projector 1 can be more compact than a conventional device. Furthermore, limitations on the place where the projector 1 is installed are more relaxed than with a conventional device, so there is much latitude in its installation.

The projector unit 2 is a projection device that projects the scanning laser beam Ra onto the projection surface F, such as the top of a desk, a screen, or a wall. The projector unit 2 is installed on the ceiling in a room, for example. Alternatively, the projector unit 2 can be installed on a frame. As shown in FIGS. 1 to 3, the projector unit 2 projects the scanning laser beam Ra in a projection region Aa on the projection surface F, thereby projecting a specific projected image (still picture, moving picture, etc.) in the projection region Aa. There are no particular restrictions on this projected image.

The sensor unit 3 is a detection device that detects light incident on a light incidence face 30. The sensor unit 3 is installed on the projection surface F, for example. Alternatively, the sensor unit 3 can be set on a frame. The sensor unit 3 detects, for example, the reflected light from the projection region Aa, or the reflected light of the scanning laser beam Ra reflected by an object U (such as the user's finger or a touch pen) located above the projection region Aa. The optical intensity of the reflected light of the scanning laser beam Ra reflected by the projection region Aa is different from the optical intensity of the reflected light of the scanning laser beam Ra reflected by the object U located above the projection region Aa. The sensor unit 3 can distinguish between and detect the reflected light of the scanning laser beam Ra reflected by the projection region Aa, and the reflected light of the scanning laser beam Ra reflected by the object U. When the sensor unit 3 detects the lights reflected by the projection region Aa and by the object U, the VUI function detects the relative position of the object U with respect to the image projected in the projection region Aa, and an input operation by the object U is detected based on this detection result.

The sensor unit 3 emits the notification light Rb, which has a wavelength in the visible light band, onto the projection surface F. The sensor unit 3 projects onto the projection surface F two notification lines L for setting the position of the projection region Aa, as shown in FIGS. 1 to 3. These two notification lines L are reference lines for setting the position of the projection region Aa. In particular, the two notification lines L are used to define the position of the edge Ea1 closest to the sensor unit 3 out of the outer edges of the projection region Aa. The edge Ea1 of the projection region Aa will hereinafter be called the bottom edge.

As long as the bottom edge Ea1 of the projection region Aa is within a trapezoidal virtual region Ab formed between the two notification lines L, the sensor unit 3 can detect the reflected light from the projection region Aa. Accordingly, the user can refer to the projection region Aa and to the two notification lines L to install the projector 1 (and particularly the sensor unit 3) in the proper location. The method for installing the projector 1 will be discussed in detail below in regard to calibration processing for the installation position of the sensor unit 3.

Figure 4A:
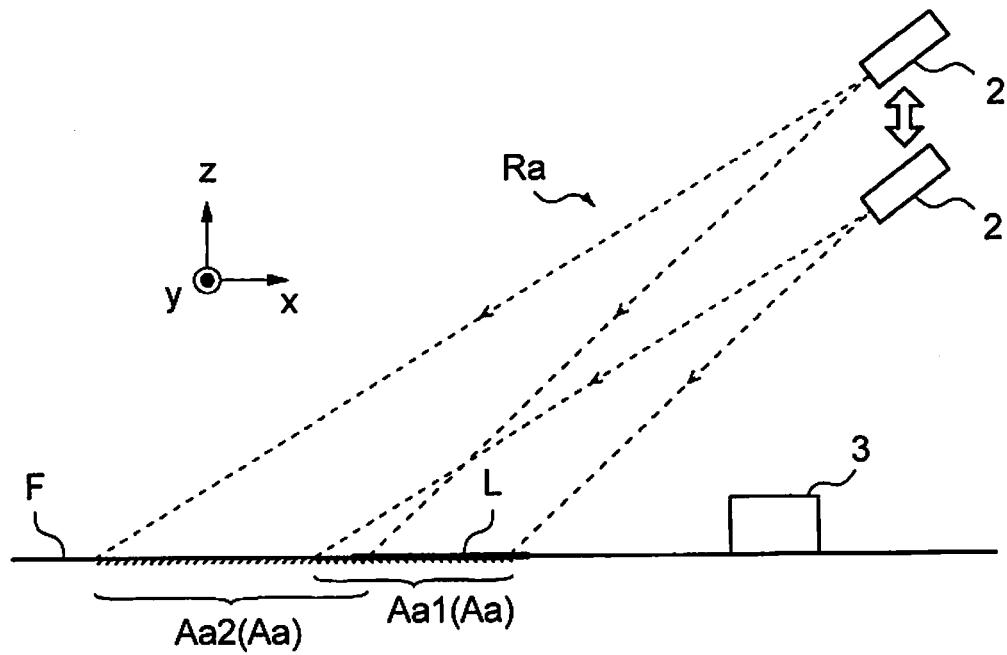
FIG. 4A is a side elevational view of the projector, illustrating the size change in the projection region according to the installation position of a projector unit of the projector.
Figure 4B:
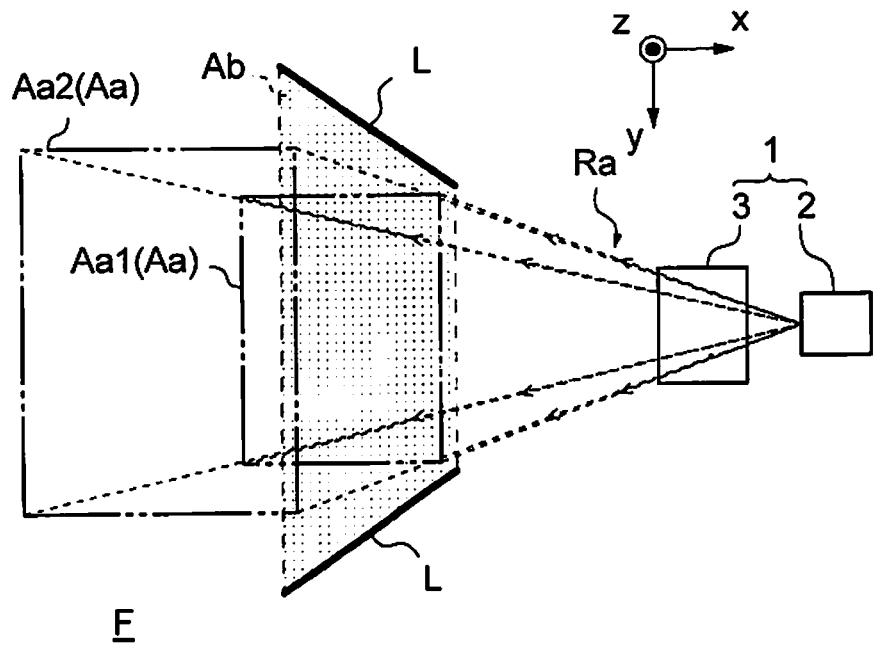
FIG. 4B is a top plan view of the projector, illustrating the size change in the projection region according to the installation position of the projector unit of the projector.

The projector unit 2 can also be installed at any location with respect to the projection surface F, independently from the sensor unit 3. Accordingly, the size of the projection region Aa (e.g., the projected image) can be varied according to the relative positional relation between the projection surface F and the projector unit 2. FIGS. 4A and 4B are a side elevational view and a top plan view of the size change in the projection region Aa according to the installation position of the projector unit 2. In FIGS. 4A and 4B, the notification light Rb and the reflected lights from the scanning laser beam Ra and the notification light Rb reflected at the projection surface F are not depicted, in order to facilitate an understanding of the main components.

As shown in FIGS. 4A and 4B, if the installation height of the projector unit 2 in the z direction is lowered, then there will be less distance between the projector unit 2 and a projection region Aa1 on the projection surface F. Thus, the size of the projection region Aa1 will be reduced. On the other hand, if the installation height of the projector unit 2 in the z direction is raised, then there will be a greater distance between the projector unit 2 and a projection region Aa2 on the projection surface F. Thus, the size of the projection region Aa2 will be expanded. Thus, even if the size of the projection region Aa changes, the sensor unit 3 can still be installed in the proper location relative to the projection region Aa. This makes it possible for the sensor unit 3 to detect the reflected light from the projection region Aa.

Figure 5:
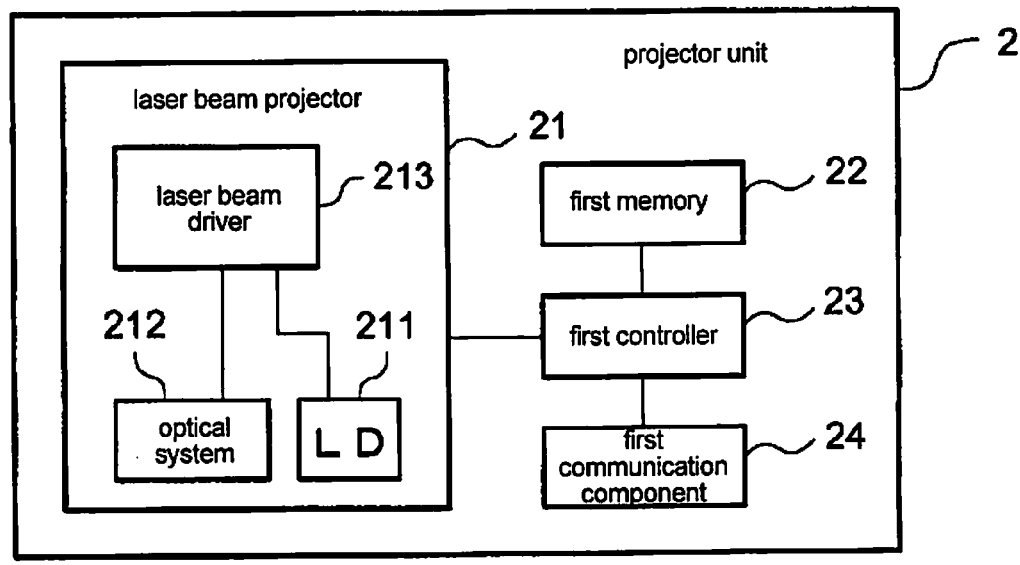
FIG. 5 is a block diagram of the configuration of the projector unit of the projector.

Next, the specific configuration of the projector unit 2 will be described. FIG. 5 is a block diagram of the configuration of the projector unit 2. The projector unit 2 includes a laser beam projector 21 (e.g., a light projector), a first memory 22, a first controller 23, and a first communication component 24.

The laser beam projector 21 projects onto the projection surface F the scanning laser beam Ra for projecting the projected image in the projection region Aa. This laser beam projector 21 has a laser diode 211, an optical system 212, and a laser beam driver 213. Hereinafter, the laser diode 211 referred to as an LD.

The LD 211 is a light source that emits the laser beam Ra with a wavelength in the visible light band. This LD 211 can, for example, be a light emitting element that emits a laser beam of a single color, or can be formed of a plurality of light emitting elements that emit laser beams of different colors (such as red, green, and blue).

The laser beam Ra emitted from the LD 211 is projected through the optical system 212 onto the projection surface F. The laser beam driver 213 controls the emission and the optical intensity of the LD 211 based on a control signal outputted from the first controller 23. Furthermore, the laser beam driver 213 two-dimensionally scans the laser beam Ra emitted from the LD 211 over the projection region Aa by controlling the drive of the optical system 212 based on a control signal outputted from the first controller 23. For example, the laser beam driver 213 scans the laser beam Ra in the y direction from one end of the projection region Aa (such as the top end in FIG. 3) to the other end (such as the bottom end in FIG. 2), based on a horizontal synchronization signal outputted from the first controller 23. Once scanning of one line in the y direction is finished, then the laser beam driver 213 shifts the laser beam Ra by a specific distance in the x direction in FIG. 1 based on a vertical synchronization signal outputted from the first controller 23. Then, the laser beam driver 213 again scans the laser beam Ra in the y direction. These steps are repeated so that the laser beam Ra is two-dimensionally scanned over the entire projection region Aa, thereby projecting an image in the projection region Aa.

The first memory 22 is a nonvolatile storage medium, and stores programs, control information, and the like used by the first controller 23 and so forth. The first memory 22 can be configured separately from the first controller 23 as in FIG. 5. However, the first memory 22 can also be included in the first controller 23.

The first controller 23 uses the programs, the control information, and the like stored in the first memory 22 to control the various components of the projector unit 2. This first controller 23 can be realized in the form of an MPU (Micro Processing Unit), a CPU (Central Processing Unit), or another such semiconductor chip, or in the form of an electrical circuit.

The first communication component 24 is an interface used for communicating with the sensor unit 3.

Figure 6:
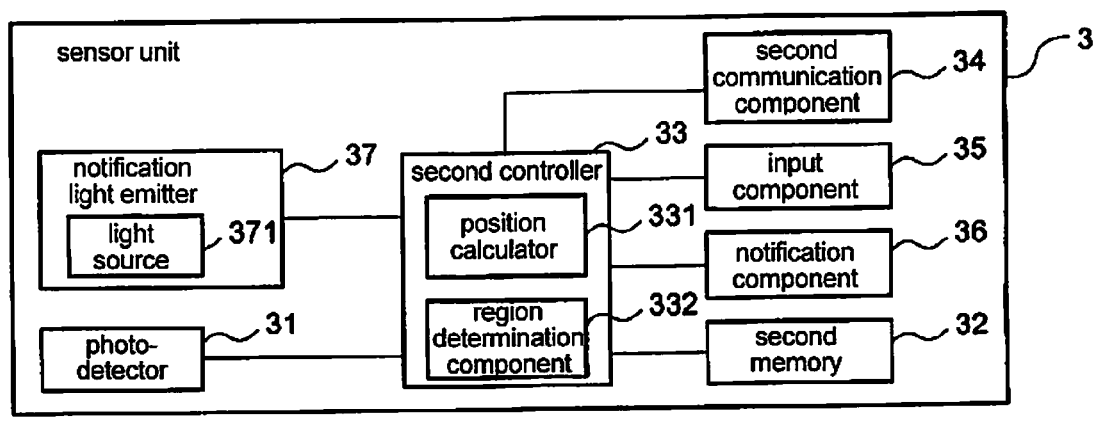
FIG. 6 is a block diagram of the configuration of a sensor unit of the projector.

Next, the specific configuration of the sensor unit 3 will be described. FIG. 6 is a block diagram of the configuration of the sensor unit 3. The sensor unit 3 includes a photodetector 31, a second memory 32, a second controller 33, a second communication component 34, an input component 35, a notification component 36, and a notification light emitter 37. In addition, the sensor unit 3 can further includes a remote control (not shown) operated by the user, and a receiver (not shown) that receives input signals from the remote control.

The photodetector 31 is a sensor having a photodiode or other such light receiving element, for example. The photodetector 31 detects light that is incident on the light incidence face 30 of the sensor unit 3 (see FIG. 1). The photodetector 31 can detect, for example, the reflected light of the scanning laser beam Ra reflected by the projection region Aa or by the object U located above the projection region Aa within a detectable region (e.g., a detection region).

The second memory 32 is a nonvolatile storage medium, and stores programs, control information, and the like used by the second controller 33 and so forth. The second memory 32 can be configured separately from the second controller 33 as in FIG. 6. However, the second memory 32 can also be included in the second controller 33.

The second controller 33 uses the programs, the control information, and the like stored in the second memory 32 to control the various components of the sensor unit 3. The second controller 33 can be in the form of an MPU (Micro Processing Unit), a CPU (Central Processing Unit), or another such semiconductor chip, or in the form of an electrical circuit.

The second controller 33 has a position calculator 331 and a region determination component 332. The position calculator 331 and the region determination component 332 can each be realized in the form of an electrical circuit, or they can be functional components of the second controller 33 realized by using the programs and the control information stored in the second memory 32.

The position calculator 331 calculates the relative position of the object U with respect to the projection region Aa based on the detection result of the photodetector 31 (such as the reflected light of the scanning laser beam Ra). This relative position is calculated, for example, based on the result of the reflected lights from the scanning laser beam Ra reflected by the object U and the projection region Aa, etc., being detected by the photodetector 31.

The region determination component 332 determines whether or not all or part of the projection region Aa is outside the detectable region, based on the detection result of the photodetector 31. If the region determination component 332 determines that at least part of the projection region Aa has deviated from the detectable region (not shown), then it also determines how much the projection region Aa has deviated, based on the detection result of the photodetector 31.

The second communication component 34 is an interface for communicating with the projector unit 2.

The input component 35 is an input unit that receives various input operations from the user.

The notification component 36 is an external output interface for notifying the user of various kinds of information. When it has been determined by the region determination component 332 that all or part of the projection region Aa has deviated from the detectable region of the photodetector 31, the notification component 36 sends the user a notice to that effect. The user is also given a correction method for the installation position (and orientation) of the sensor unit 3 so that the entire projection region Aa will be located within the detectable region. There are no particular restrictions on the notification content or method used by the notification component 36. The notification component 36 can send its notifications by audio, using a speaker or other such audio output component (not shown), or can display the notification content on a liquid crystal display or other such display component (not shown). Alternatively, the notification component 36 can have the second communication component 34 communicate with the projector unit 2, and thereby display the message to be conveyed to the user (such as "Move sensor unit") in the projection region Aa on the projection surface F.

The notification light emitter 37 has a light source 371 that emits the notification light Rb with a wavelength in the visible light band, and projects the two notification lines L of substantially the same length on the projection surface F (see FIGS. 1 to 3). There are no particular restrictions on this light source 371, but an example is a light emitting element or discharge tube that emits light in the visible light band, such as an LED or a laser diode element.

Figure 7:
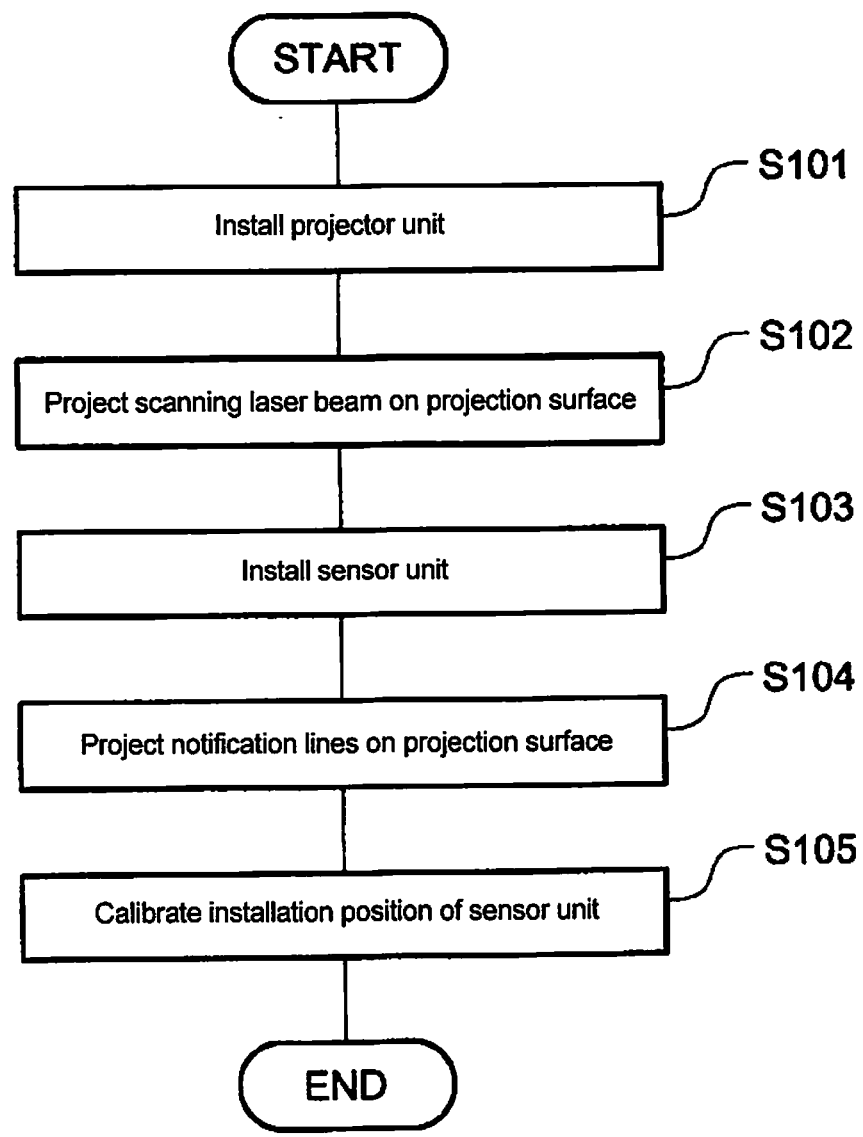
FIG. 7 is a flowchart illustrating a projector installation method of the projector.

Next, the method for installing the projector 1 will be described in detail. FIG. 7 is a flowchart illustrating a projector installation method.

First, the projector unit 2 is installed on the ceiling in a room (S101), and the scanning laser beam Ra is projected onto the projection surface F (S102). Then, the sensor unit 3 is placed on the projection surface F (S103), the notification light Rb is projected, and the notification lines L are projected onto the projection surface F (S104). The installation position of the sensor unit 3 is calibrated in order to position the projection region Aa within the detectable region of the sensor unit 3 (S105). When the calibration processing is finished, the sensor unit 3 stops the projection of the notification light Rb, and the installation of the projector 1 is complete.

With the above installation method, when the calibration processing in step S105 is complete, the projection of the notification light Rb is halted. However, the notification light Rb can instead be projected during the installation processing of the projector 1, or during some other period, or it can be projected continuously. Also, the projection and halting of the projection of the notification light Rb can be switched in response to user input received by the input component 35.

Figure 8:
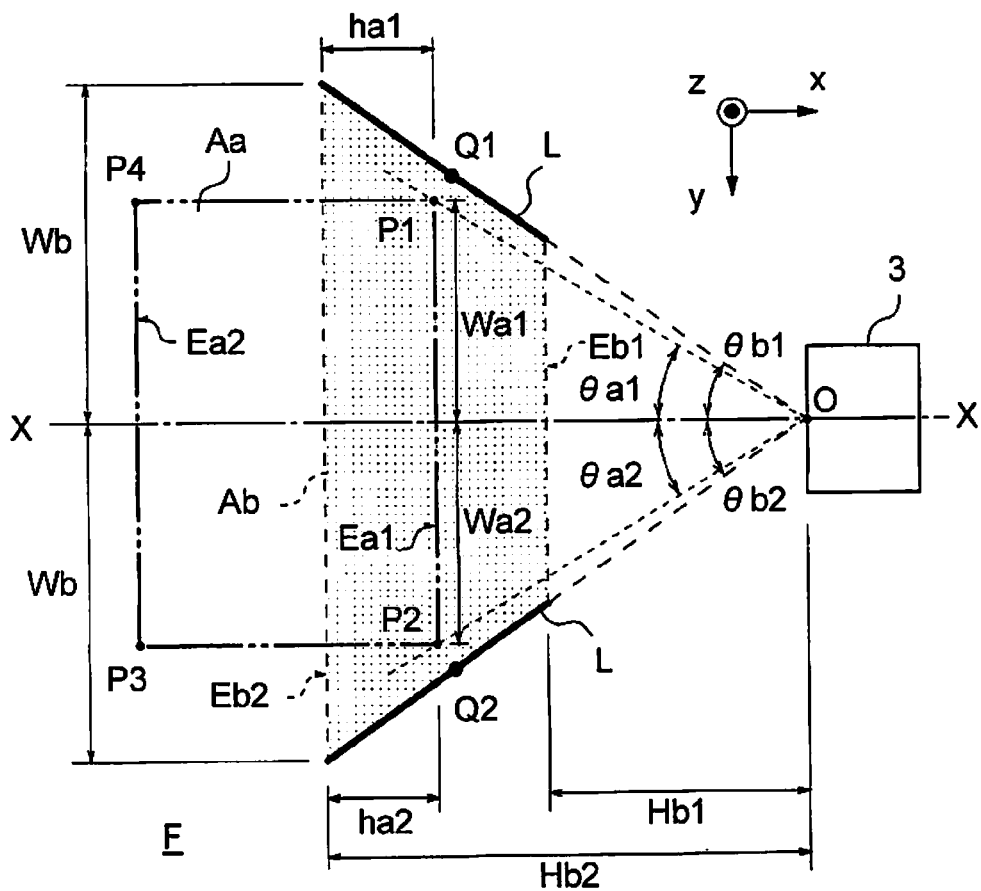
FIG. 8 is a top plan view of the projector, illustrating the positional relation between notification lines and the projection region.
Figure 9:
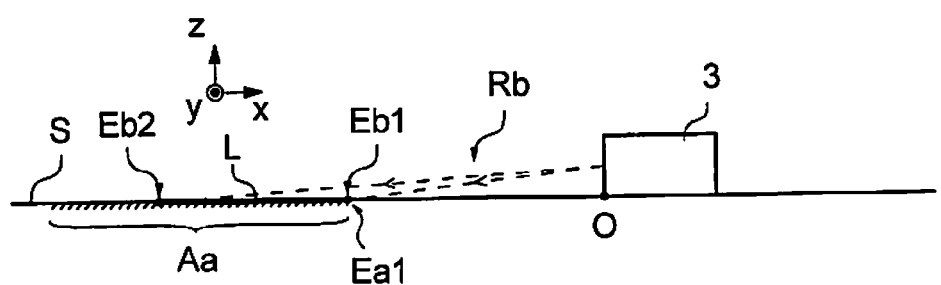
FIG. 9 is a side elevational view of the projector, illustrating a state in which the sensor unit has been installed at the position closest to the projection region.
Figure 10:
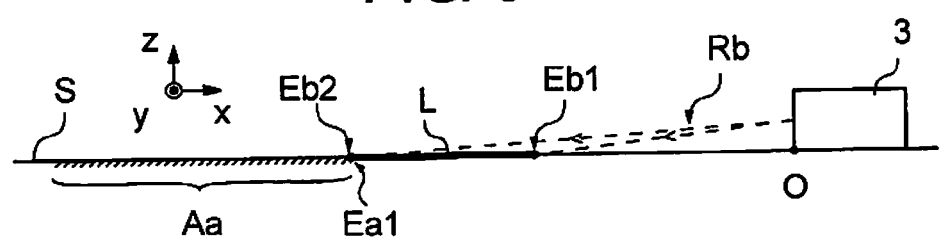
FIG. 10 is a side elevational view of the projector, illustrating a state in which the sensor unit has been installed at the position farthest from the projection region.

Next, the conditions for installing the projector 1 in the first embodiment will be described. FIG. 8 is a top plan view of the positional relation between the notification lines L and the projection region Aa. FIG. 9 is a side elevational view of a state in which the sensor unit 3 has been installed at the position closest to the projection region Aa. FIG. 10 is a side elevational view of a state in which the sensor unit 3 has been installed at the position farthest from the projection region Aa. To facilitate an understanding of the main components, the scanning laser beam Ra, the notification light Rb, and the reflected lights thereof are not shown in FIG. 8, and the scanning laser beam Ra and the reflected lights are not shown in FIGS. 9 and 10.

As shown in FIG. 8, the two notification lines L are projected substantially in line symmetry with respect to the one-dot chain line X-X. This line X-X passes through the center point of the edge closest to the sensor unit 3 (hereinafter referred to as the bottom edge Eb1) out of the outer edges of the virtual region Ab formed between the two notification lines L and the center point of the farthest edge (hereinafter referred to as the top edge Eb2). The line X-X also passes through an orthogonal projection point O of the emission point of the notification light Rb on the projection surface F as seen from the normal direction (z direction) of the projection surface F.

As shown in FIG. 8, the sensor unit 3 is installed so that the bottom edge Ea1 of the projection region Aa will be located within the virtual region Ab between the two notification lines L. Here, the bottom edge Ea1 of the projection region Aa is preferably substantially parallel to the bottom edge Eb1 and top edge Eb2 of the virtual region Ab.

As shown in FIG. 9, the sensor unit 3 can move closer to the projection region Aa until the bottom edge Ea1 of the projection region Aa is at substantially the same location as the bottom edge Eb1 of the virtual region Ab. Also, as shown in FIG. 10, the sensor unit 3 can move away from the projection region Aa until the bottom edge Ea1 of the projection region Aa is at substantially the same location as the top edge Eb2 of the virtual region Ab.

The conditions for putting the projection region Aa within the detectable region of the sensor unit 3 can be expressed by the following three Mathematical Expressions 1 to 3.

$$0 < wa1, wa2 \leq Wb \quad \text{(Expression 1)}$$

$$0 \leq ha1, ha2 \leq (Hb2 - Hb1) \quad \text{(Expression 2)}$$

$$\theta a1 \leq \theta b1, \text{ and } \theta a2 \leq \theta b2 \quad \text{(Expression 3)}$$

In Expression 1 above, wa1 is the spacing (that is the shortest distance in the y direction) between the line X-X and one end point P1 of the bottom edge Ea1 of the projection region Aa, and wa2 is the spacing between the line X-X and the other end point P2. Wb is the spacing between the line X-X and the end point of the top edge Eb2 of the virtual region Ab between the two notification lines L.

In Expression 2 above, ha1 is the spacing (that is the shortest distance in the x direction) between the end point P1 on the bottom edge Ea1 of the projection region Aa and the top edge Eb2 of the virtual region Ab, and ha2 is the spacing between the other end point P2 and the top edge Eb2. Hb1 is the distance in the x direction between the orthogonal projection point O and the bottom edge Eb1 of the virtual region Ab, and Hb2 is the distance in the x direction between the orthogonal projection point O and the top edge Eb2 of the virtual region Ab. Also, $0 < Hb1 < Hb2$.

In Expression 3 above, $\theta a1$ is the angle formed by the line X-X and an imaginary line passing through the orthogonal projection point O and the end point P1 on the bottom edge Ea1 of the projection region Aa, and $\theta a2$ is the angle formed by the line X-X and an imaginary line passing through the orthogonal projection point O and the other end point P2. $\theta b1$ is the angle formed by the X-X line and an imaginary line passing through the orthogonal projection point O and a point Q1 on the notification line L that is closest to the end point P1. $\theta b2$ is the angle formed by the X-X line and an imaginary line passing through the orthogonal projection point O and a point Q2 on the notification line L that is closest to the other end point P2.

The end points P1 and P2 of the bottom edge Ea1 of the projection region Aa are preferably away from the outer edge of the virtual region Ab. Specifically, in Expression 1 above, it is preferable if $0 < wa1$ and $wa2 < Wb$, in Expression 2 above if $0 < ha1$ and $ha2 < (Hb2 - Hb1)$, and in Expression 3 above if $\theta a1 < \theta b1$ and $\theta a2 < \theta b2$. Furthermore, in Expression 1 above, it is more preferable if $wa1 = wa2$, and in Expression 3 above if $\theta a1 = \theta a2$. This will allow the bottom edge Ea1 of the projection region Aa to be located more accurately within the virtual region Ab. Thus, the reflected light from the entire projection region Aa can be properly detected by the sensor unit 3.

Figure 11:
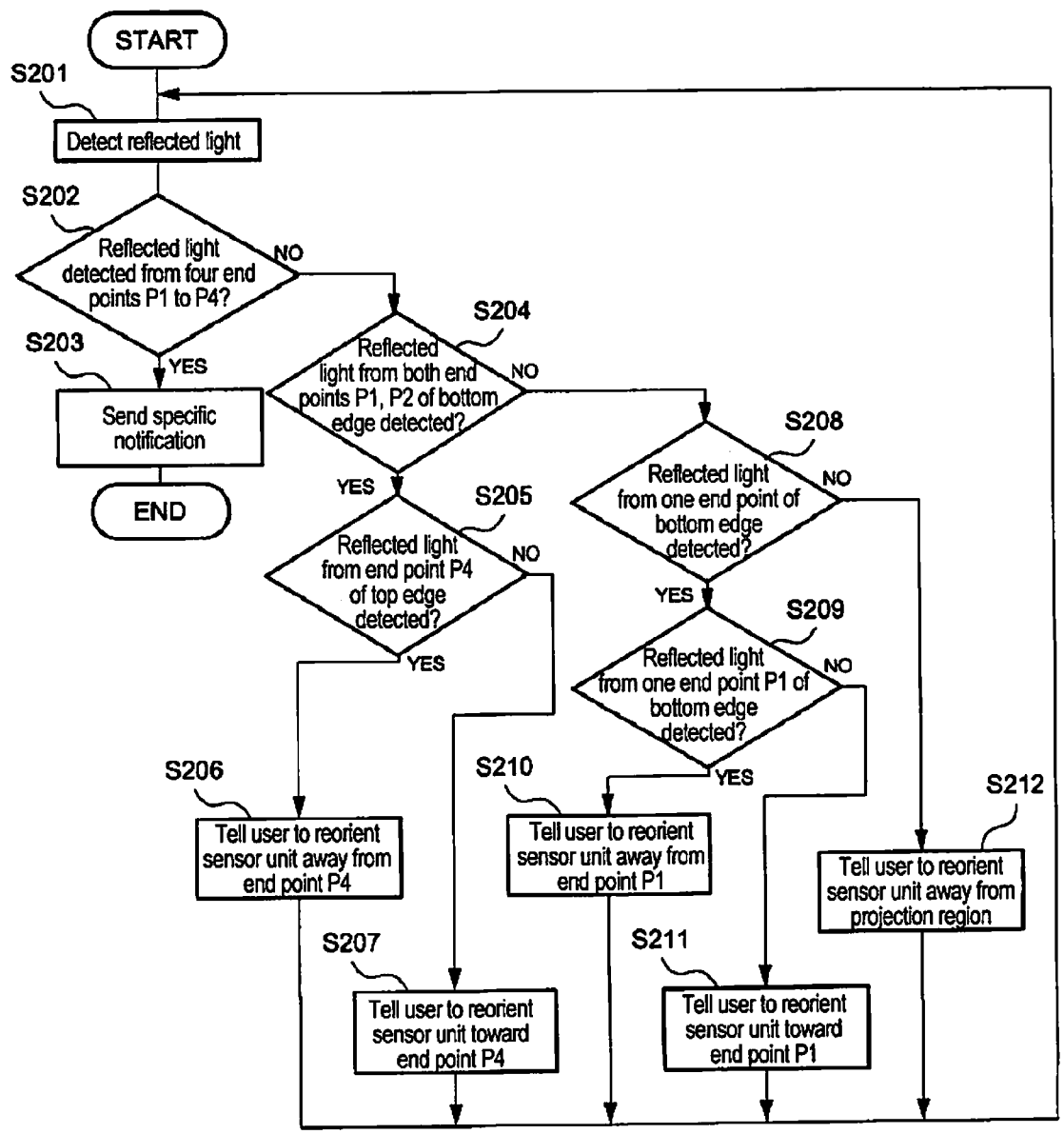
FIG. 11 is a flowchart illustrating calibration processing of the installation position of the sensor unit.

Next, the calibration processing for the installation position of the sensor unit 3 will be described in detail. FIG. 11 is a flowchart illustrating calibration processing of the installation position of the sensor unit 3. At the point when the calibration processing in FIG. 11 begins, the scanning laser beam Ra is projected from the projector unit 2 onto the projection surface F, and the notification light Rb is being emitted from the sensor unit 3.

First, the sensor unit 3 detects the reflected light of the scanning laser beam Ra reflected by the projection region Aa (step S201). The sensor unit 3 then determines whether or not reflected light is detected from the end points P1 to P4 (see FIG. 8) of the bottom edge Ea1 and the edge Ea2 farthest from the sensor unit 3 out of the outer edges of the projection region Aa, based on the detection result for the reflected light (step S202). The edge Ea2 of the projection region Aa will hereinafter be called the top edge.

If all the reflected light has been detected from the four end points P1 to P4 (Yes in step S202), then a specific message is given to the user (step S203). For example, the user is notified that the sensor unit 3 has been installed in the proper position. Or, the notification can give instructions about the installation method so that the bottom edge Ea1 of the projection region Aa will be substantially parallel to the bottom edge Eb1 (or top edge Eb2) of the virtual region Ab of the two notification lines L. After the user has been notified that the calibration processing is complete, the calibration processing in FIG. 11 is ended.

If the reflected light has not been detected from at least one of the four end points P1 to P4 (No in step S202), then it is determined whether or not the reflected light is detected from both of the end points P1 and P2 of the bottom edge Ea1 of the projection region Aa (step S204).

If the reflected light is detected from both of the end points P1 and P2 (Yes in step S204), then the sensor unit 3 determines whether or not the reflected light is detected from the end point P4 of the top edge Ea2 of the projection region Aa (step S205).

If reflected light is detected from the end point P4 (Yes in step S205), then the user is told to reinstall the sensor unit 3 so that it is facing away from the end point P4 (step S206). Specifically, the user is told to turn the sensor unit 3 counterclockwise, as seen from the normal direction (z direction) of the projection surface F in FIG. 8, for example. Upon receiving this notification, the user can reinstall the sensor unit 3 so that it is in the proper position. The calibration processing then goes back to step S201.

If the reflected light is not detected from the end point P4 (No in step S205), then the user is told to reinstall the sensor unit 3 so that it is facing closer to the end point P4 (step S207). Specifically, the user is told to turn the sensor unit 3 clockwise, as seen from the normal direction (z direction) of the projection surface F in FIG. 8, for example. Upon receiving this notification, the user can reinstall the sensor unit 3 so that it is in the proper position. The calibration processing then goes back to step S201.

In step S204, if the reflected light is not detected from at least one of the end points P1 and P2 of the bottom edge Ea1 (No in step S204), then it is determined whether or not the reflected light is detected from either of the two end points P1 and P2 (step S208).

If the reflected light from one of them has been detected (Yes in step S208), then the sensor unit 3 determines whether or not the reflected light from the end point P1 of the bottom edge Ea1 has been detected (Yes in step S209). If the reflected light from the end point P1 of the bottom edge Ea1 has been detected (Yes in step S209), then the user is told to reinstall the sensor unit 3 so that it faces away from the end point P1 (that is, counterclockwise in FIG. 8) (step S210). Upon receiving this notification, the user can reinstall the sensor unit 3 so that it is in the proper position. The calibration processing then goes back to step S201.

If the reflected light is not detected from the end point P1 of the bottom edge Ea1 (No in step S209), then the user is told to reinstall the sensor unit 3 so that it is facing closer to the end point P1 (that is, clockwise in FIG. 8) (step S211). Upon receiving this notification, the user can reinstall the sensor unit 3 so that it is in the proper position. The calibration processing then goes back to step S201.

In step S208, if the reflected light is not detected from both of the end points P1 and P2 (No in step S208), then the user is told to reinstall the sensor unit 3 away from the projection region Aa in the x direction (step S212). Upon receiving this notification, the user can reinstall the sensor unit 3 so that it is in the proper position. The calibration processing then goes back to step S201.

The calibration processing performed for the installation position of the sensor unit 3 in the first embodiment is described above. In step S205 of the calibration processing discussed above, it can be determined whether or not the reflected light from the end point P3 has been detected, instead of reflected light from the end point P4. In this case, it should go without saying that the processing in steps S206 and S207 is switched around. That is, in step S206 the user is told to reinstall the sensor unit 3 so that it faces away from the end point P3 (that is, clockwise in FIG. 8). Also, in step S207 the user is told to reinstall the sensor unit 3 so that it faces closer to the end point P3 (counterclockwise in FIG. 8).

In step S209 of the calibration processing above, it can be determined whether or not the reflected light from the end point P2 has been detected, instead of reflected light from the end point P1. In this case, it should go without saying that the processing in steps S210 and S211 are switched around. That is, in step S210 the user is told to reinstall the sensor unit 3 so that it faces away from the end point P2 (that is, clockwise in FIG. 8). Also, in step S211 the user is told to reinstall the sensor unit 3 so that it faces closer to the end point P2 (counterclockwise in FIG. 8).

As discussed above, the projector 1 includes the projector unit 2 that projects the scanning laser beam Ra in the projection region Aa on the projection surface F, and the sensor unit 3 that is disposed away from the projector unit 2. The sensor unit 3 has the photodetector 31 and the notification light emitter 37. The photodetector 31 detects the reflected light of the scanning laser beam Ra projected from the projector unit 2. The notification light emitter 37 emits onto the projection surface F the notification light Rb for setting the position of the projection region Aa within the detectable region (not shown) in which the photodetector 31 can detect the reflected light of the scanning laser beam Ra.

With this configuration, since the projector unit 2 and the sensor unit 3 are disposed away from each other, the projector 1 can be more compact. Limitations on the place where the projector 1 is installed can also be relaxed. Also, since the projector unit 2 can be disposed in any position, without being limited to the installation position of the sensor unit 3, the projection region Aa can be set to the desired size according to the relative position of the projector unit 2 with respect to the projection surface F. Furthermore, the projection region Aa can be set within the detectable region (not shown) of the photodetector 31 based on the notification light Rb emitted from the notification light emitter 37. Therefore, even though the projector unit 2 and the sensor unit 3 are disposed away from each other, the sensor unit 3 can detect the reflected light of the scanning laser beam Ra projected from the projector unit 2.

Also, with the projector 1, the notification light Rb projects the notification lines L onto the projection surface F. These notification lines L are projected images for setting at least the position of the bottom edge Ea1 closest to the sensor unit 3 out of the outer edges of the projection region Aa to within the detectable region (not shown).

If this is done, then the position of the projection region Aa within the detectable region (not shown) of the sensor unit 3 can be set by setting at least the position of the bottom edge Ea1 closest to the sensor unit 3 in the projection region Aa based on the projected images (i.e., the notification lines L) of the notification light Rb.

Also, with the projector 1, the sensor unit 3 further includes the region determination component 332 that determines whether or not all or part of the projection region Aa is outside the detectable region, based on the detection result of the photodetector 31.

The reflected light of the scanning laser beam Ra projected in the projection region Aa from the projector unit 2, for example, is incident on the photodetector 31. Therefore, the region determination component 332 can determine whether or not all or part of the projection region Aa is outside the detectable region based on the detection result of the photodetector 31 that detects this reflected light.

Also, with the projector 1, the region determination component 332 determines whether or not at least both end points P1 and P2 of the bottom edge Ea1 closest to the sensor unit 3 out of the outer edges of the projection region Aa are within the detectable region.

If the projection region Aa is within the detectable region of the photodetector 31, then at least the two end points P1 and P2 of the bottom edge Ea1 closest to the sensor unit 3 in the projection region Aa are within the detectable region. Also, in this case, the two end points P3 and P4 of the top edge Ea2 farthest from the sensor unit 3 are usually also within the detectable region. Conversely, even if the two end points P3 and P4 of the top edge Ea2 farthest from the sensor unit 3 are within the detectable region, there is a probability that the two end points P1 and P2 of the bottom edge Ea1 closest to the sensor unit 3 will not be within the detectable region. Therefore, whether or not the projection region Aa is within the detectable region can be reliably and easily determined by determining whether or not at least the two end points P1 and P2 are within the detectable region.

Also, with the projector 1, the sensor unit 3 further has the notification component 36 that performs notification based on the determination result of the region determination component 332.

In this case, the user can be given various notifications related to the relation between the projection region Aa and the detectable region (not shown) of the photodetector 31, based on the determination result of the region determination component 332.

Also, with the projector 1, if it is determined by the region determination component 332 that at least part of the projection region Aa is outside the detectable region, then the notification component 36 sends out the correction method for setting the projection region Aa to within the detectable region. The sent correction method is used to correct the installation position and orientation of the sensor unit 3.

As a result, the user is notified of a correction method for setting the projection region Aa to within the detectable region when at least part of the projection region Aa is determined to be outside the detectable region of the photodetector 31. Therefore, the user can correct the installation position and orientation of the sensor unit 3 based on the received correction method. Therefore, the user can easily set the entire projection region Aa to within the detectable region.

Second Embodiment

Figure 12:
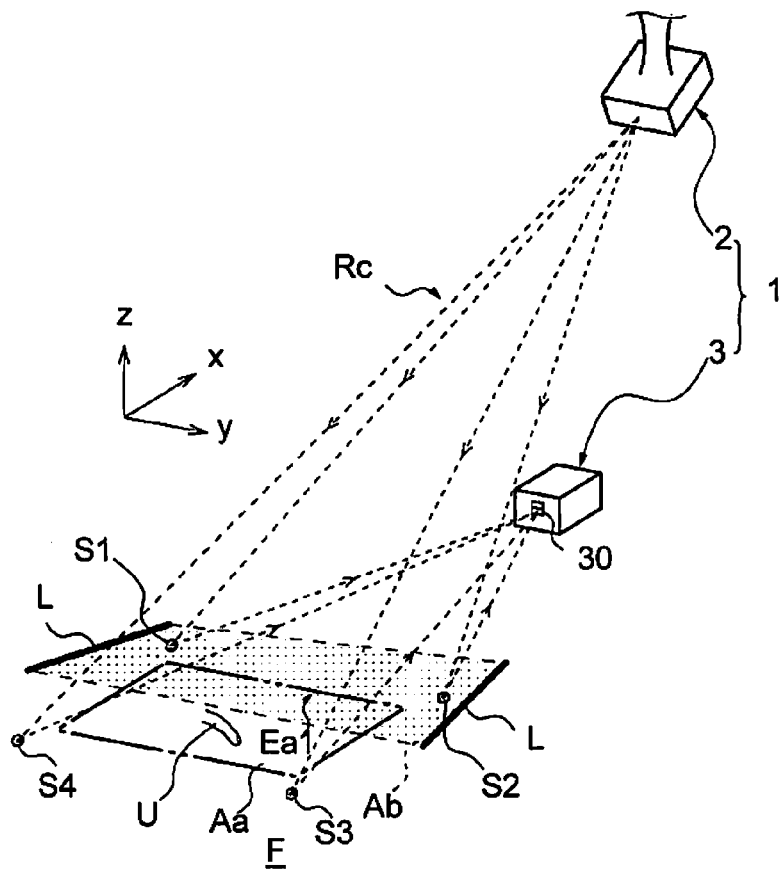
FIG. 12 is a perspective view of a projector in accordance with a second embodiment.

Referring now to FIG. 12, a projector 1 in accordance with a second embodiment will now be explained. In view of the similarity between the first and second embodiments, the parts of the second embodiment that are functionally identical to the parts of the first embodiment will be given the same reference numerals as the parts of the first embodiment. Moreover, the descriptions of the parts of the second embodiment that are identical to the parts of the first embodiment may be omitted for the sake of brevity. FIG. 12 is a perspective view of the appearance of the projector 1 in accordance with the second embodiment. In FIG. 12, the scanning laser beam Ra, the notification light Rb, and their reflected lights are not depicted, in order to make it easier to understand the main components.

As shown in FIG. 12, in the second embodiment definition light Rc for defining the projection region Aa is projected from the projector unit 2, and this projected image (e.g., the spots S1 to S4 (e.g., indicators)) are projected onto the projection surface F. The sensor unit 3 detects the reflected light of the definition light Rc reflected by the spots S1 to S4, and notification is performed based on this detection result. The user then refers to the two notification lines L of the virtual region Ab and the two spots S1 and S2 located near the ends of the bottom edge Ea1 of the projection region Aa, and installs the projector 1. Everything else is the same as in the first embodiment. In the following discussion, components that are the same as in the first embodiment will be numbered the same and not described again.

Figure 13:
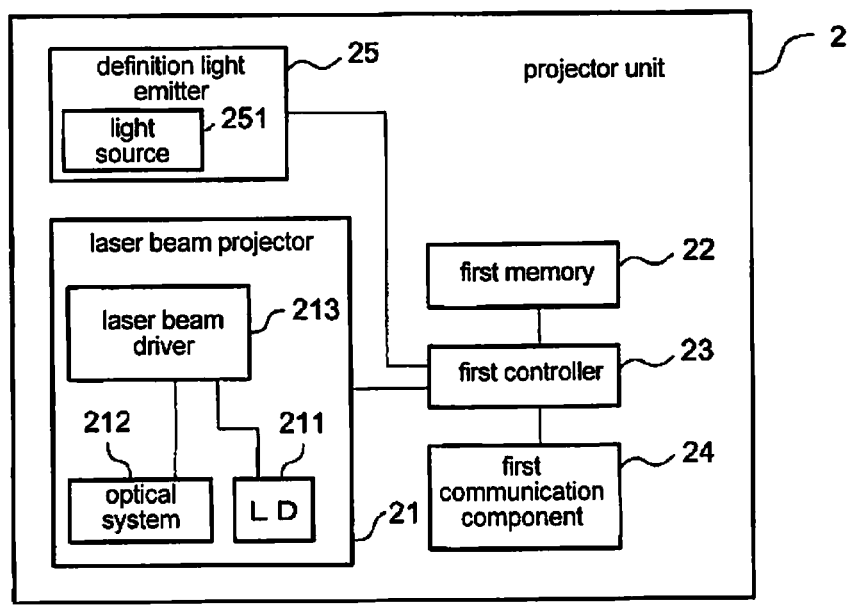
FIG. 13 is a block diagram of the configuration of a projector unit of the projector.

FIG. 13 is a block diagram of the configuration of the projector unit 2 in accordance with the second embodiment. The projector unit 2 further includes a definition light emitter 25. This definition light emitter 25 has a light source 251 that emits the definition light Rc with a wavelength in the visible light band, and projects an image with the four spots S1 to S4 onto the projection surface F. There are no particular restrictions on the light source 251 of the definition light Rc, but examples include a discharge tube or a light emitting element that emits light with a wavelength in the visible light band, such as an LED or a laser diode.

Figure 14:
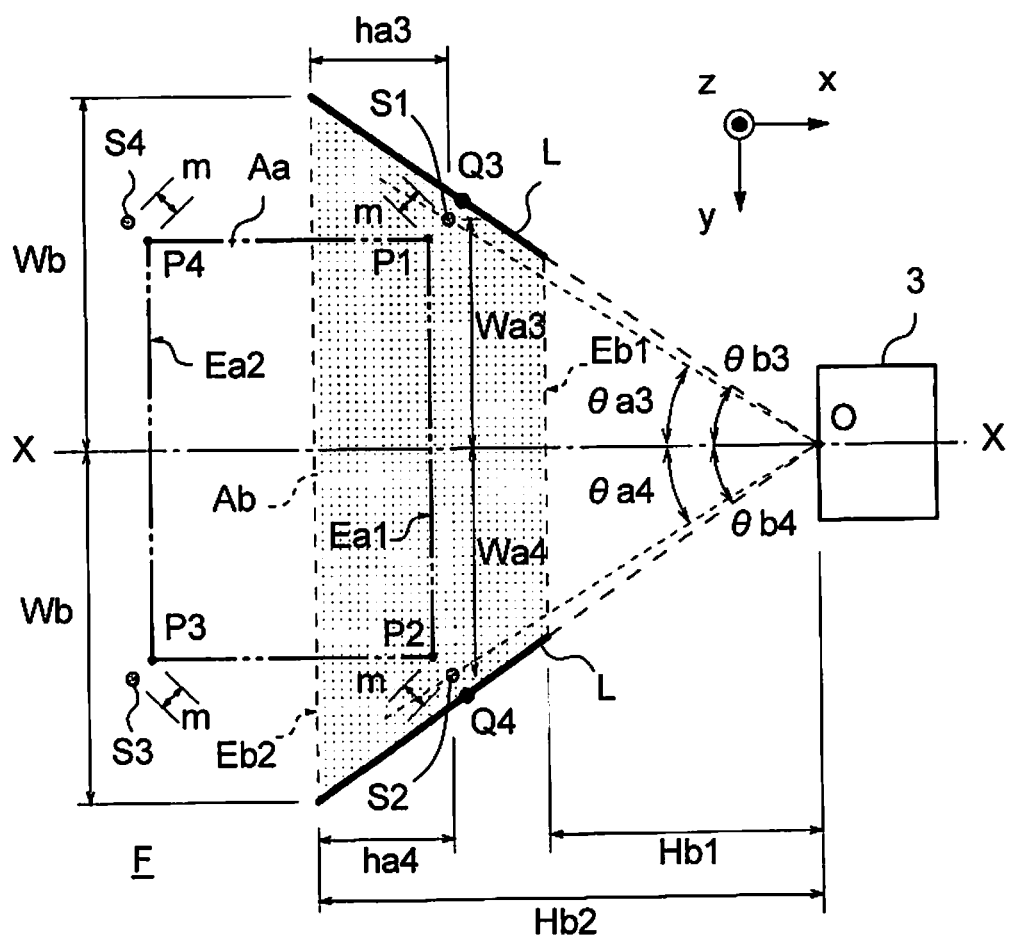
FIG. 14 is a top plan view of the projector, illustrating the positional relation between notification lines and the projection region.

The conditions for installing the projector 1 in the second embodiment will now be described. FIG. 14 is a top plan view of the positional relation between the notification lines L and the projection region Aa in the second embodiment. In FIG. 14, the scanning laser beam Ra, the notification light Rb, the definition light Rc, and their reflected light are not depicted, in order to make it easier to understand the main components.

As shown in FIG. 14, the sensor unit 3 is installed so that the spots S1 and S2 are located within the virtual region Ab between the two notification lines L, on the projection surface F. The virtual line segment linking the spots S1 and S2 here are preferably substantially parallel to the top edge Eb2 and the bottom edge Eb1 of the virtual region Ab.

As shown in FIG. 14, the four spots S1 to S4 projected by the definition light emitter 25 are respectively projected in a region near the four end points P1 to P4 of the projection region Aa. The center points of the spots S1 to S4 are respectively m distance (m≥0) away from the end points P1 to P4 of the projection region Aa. In FIG. 14, the spacings between the end points P1 to P4 and the center points of the spots S1 to S4 (that is, the shortest distance between the two) are all the same, but can be different from one another. Nor are there any particular restrictions on the shapes of the spots S1 to S4. The shapes can, for example, be circular as shown in FIG. 14, or can be polyhedral (n-hedral; where n is a positive integer of 3 or more), cross shaped, or the like. Also, the shapes of the spots S1 to S4 can all be the same, or one or more of them can have a different shape.

These spots S1 to S4 are used to set the position of the projection region Aa. In the second embodiment, the sensor unit 3 will be able to detect the reflected light from the projection region Aa as long as the spots S1 and S2 near the end points P1 and P2 of the bottom edge Ea1 are within the virtual region Ab between the two notification lines L. Accordingly, the user can install the projector 1 (and particularly the sensor unit 3) in the proper position by referring to the two spots S1 and S2 and the two notification lines L of the virtual region Ab.

These four spots S1 to S4 are projected only during the installation period of the projector 1 (such as during calibration processing of the installation position of the sensor unit 3), but can also be projected during some other period, and can also be projected all the time. The four spots S1 to S4 can be switched between being projected and not being projected according to input operation from the user received by the input component 35.

The conditions for putting the projection region Aa within the detectable region of the sensor unit 3 can be expressed by the following three Mathematical Expressions 4 to 6.

$$0 < wa3, \ wa4 \leq Wb \quad \text{(Expression 4)}$$

$$0 \leq ha3, \ ha4 \leq (Hb2 - Hb1) \quad \text{(Expression 5)}$$

$$\theta a3 \leq \theta b3, \text{ and } \theta a4 \leq \theta b4 \quad \text{(Expression 6)}$$

In Expression 4 above, wa3 is the spacing (that is the shortest distance in the y direction) between the one-dot chain line X-X and the center point of the spot S1, and wa4 is the spacing between the line X-X and the center point of the spot S2. Wb is the spacing between the line X-X and the end point of the top edge Eb2 of the virtual region Ab between the two notification lines L.

In Expression 5 above, ha3 is the spacing (that is the shortest distance in the x direction) between the top edge Eb2 of the virtual region Ab and the center point of the spot S1, and ha4 is the spacing between the top edge Eb2 and the center point of the spot S2. Hb1 is the distance in the x direction between the orthogonal projection point O and the bottom edge Eb1 of the virtual region Ab, and Hb2 is the distance in the x direction between the orthogonal projection point O and the top edge Eb2 of the virtual region Ab. Also, 0<Hb1<Hb2.

In Expression 6 above, θa3 is the angle formed by the line X-X and an imaginary line passing through the orthogonal projection point O and the center point of the spot S1, and θa4 is the angle formed by the line X-X and an imaginary line passing through the orthogonal projection point O and the center point of the spot S1. θb3 is the angle formed by the X-X line and an imaginary line passing through the orthogonal projection point O and a point Q3 on a notification line L that is closest to the spot S1. θb4 is the angle formed by the X-X line and an imaginary line passing through the orthogonal projection point O and a point Q4 on a notification line L that is closest to the spot S2.

The end points P1 and P2 of the bottom edge Ea1 of the projection region Aa are preferably away from the outer edge of the virtual region Ab. Specifically, in Expression 4 above, it is preferable if 0<wa3 and wa4<Wb, in Expression 5 above if 0<ha3 and ha4<(Hb2−Hb1), and in Expression 6 above if θa3<θb3 and θa4<θb4. Furthermore, in Expression 4 above, it is more preferable if wa3=wa4, and in Expression 6 above if θa3=θa4. This will allow the spots S1 and S2 to be located more accurately within the virtual region Ab. Thus, the reflected light from the entire projection region Aa can be properly detected by the sensor unit 3.

Figure 15:
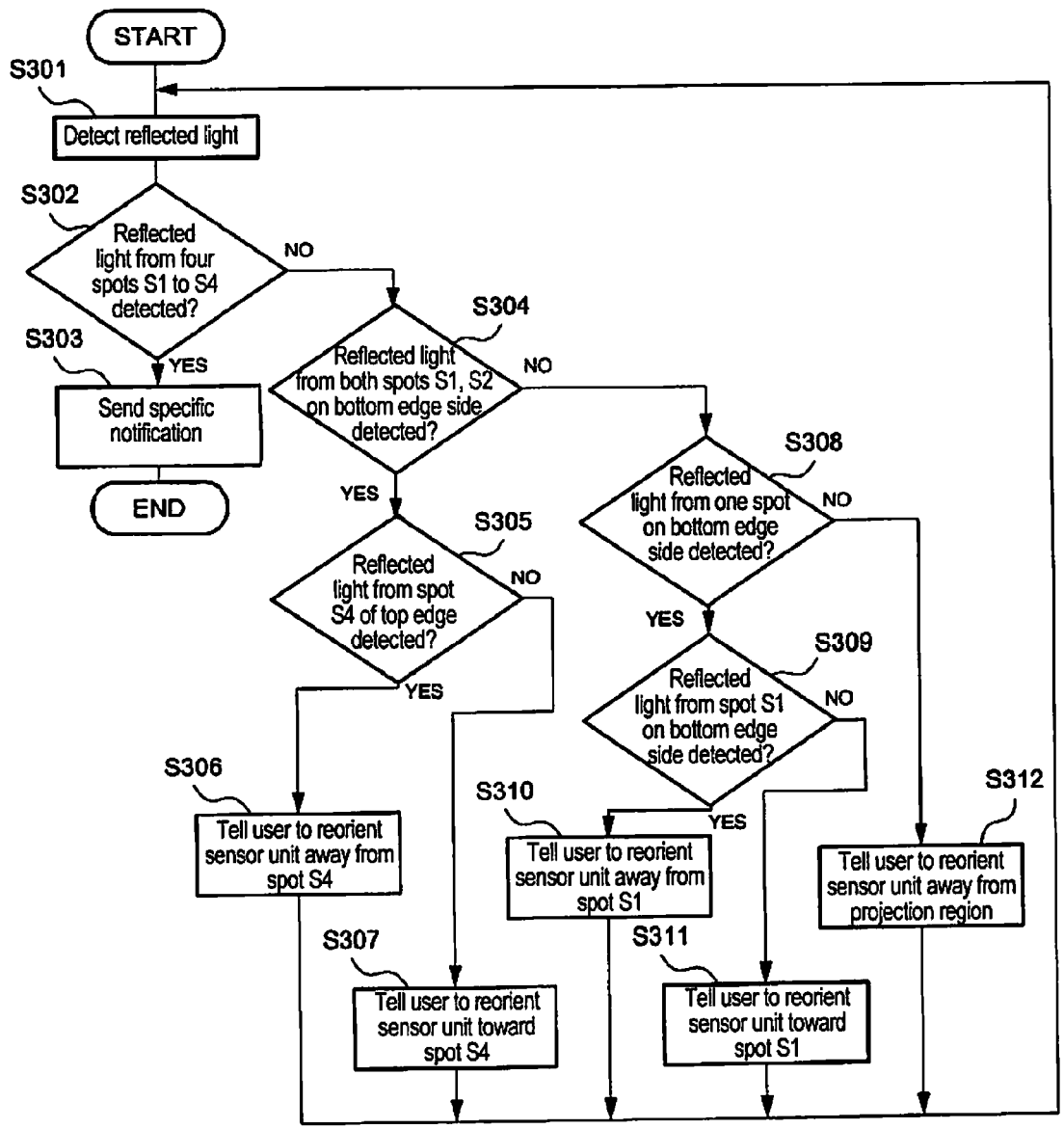
FIG. 15 is a flowchart illustrating calibration processing for the installation position of a sensor unit of the projector.

Next, the calibration processing for the installation position of the sensor unit 3 will be described in detail. FIG. 15 is a flowchart illustrating calibration processing for the installation position of the sensor unit 3 in the second embodiment. At the point when the calibration processing in FIG. 15 begins, the definition light Rc is projected from the projector unit 2 onto the projection surface F, and the notification light Rb is emitted from the sensor unit 3.

First, the sensor unit 3 detects the reflected light of the definition light Rc reflected by the projection region Aa (step S301). The sensor unit 3 then determines whether or not all of the reflected lights from the four spots S1 to S4 has been detected, based on the detection result of the reflected light (step S302).

If all of the reflected lights from the four spots S1 to S4 has been detected (Yes in step S302), then a specific notification is sent to the user (step S303). For instance, the user is told that the sensor unit 3 has been installed in the proper position. In addition, the user can be apprised of an installation method, etc., such that the virtual line segment linking the spots S1 and S3 (specifically, the virtual line parallel to the bottom edge Ea1 of the projection region Aa) will be substantially parallel to the top edge Eb2 of the virtual region Ab between the two notification lines L. The user is then notified that the calibration processing is complete, after which the calibration processing in FIG. 11 is ended.

If the reflected light from any of the four spots S1 to S4 has not been detected (No in step S302), then it is determined whether or not the reflected lights from both of the spots S1 and S2 on the bottom edge Ea1 side of the projection region Aa has been detected (step S304).

If the reflected lights from both of the spots S1 and S2 has been detected (Yes in step S304), then the sensor unit 3 then determines whether or not the reflected light has been detected from the spot S4 on the top edge Ea2 side of the projection region Aa (step S305).

If the reflected light from the spot S4 has been detected (Yes in step S305), then the user is told to reinstall the sensor unit 3 so that its orientation faces away from the spot S4 (step S306). That is, the user is told to reinstall the sensor unit 3 so that its orientation is turned counterclockwise, as seen from the normal direction (z direction) of the projection surface F in FIG. 14, for example. Upon receiving this notification, the user can reinstall the sensor unit 3 so that it is in the proper position. The calibration processing then returns to step S301.

If the reflected light from the spot S4 has not been detected (No in step S305), then the user is told to reinstall the sensor unit 3 so that its orientation faces toward the spot S4 (step S307). Specifically, the user is told to reinstall the sensor unit 3 so that it is turned clockwise, as seen from the normal direction of the projection surface F in FIG. 14, for example. Upon receiving this notification, the user can reinstall the sensor unit 3 so that it is in the proper position. The calibration processing then returns to step S301.

In step S304, if the reflected light has not been detected from both of the two spots S1 and S2 on the bottom edge Ea1 side (No in step S304), then it is determined whether or not the reflected light has been detected from one of the spots S1 and S2 (step S308).

If the reflected light has been detected from one of them (Yes in step S308), then the sensor unit 3 determines whether or not the reflected light has been detected from the spot S1 on the bottom edge Ea1 side (step S309). If the reflected light is detected from the spot S1 (Yes in step S309), then the user is told to reinstall the sensor unit 3 so that its orientation is turned away from the spot S1 (that is, counterclockwise in FIG. 14) (step S310). Upon receiving this notification, the user can reinstall the sensor unit 3 so that it is in the proper position. The calibration processing then returns to step S301.

If no reflected light has been detected from the spot S1 on the bottom edge Ea1 side (No in step S309), then the user is told to reinstall the sensor unit 3 so that its orientation is facing toward the spot S1 (that is, clockwise in FIG. 14) (step S311). Upon receiving this notification, the user can reinstall the sensor unit 3 so that it is in the proper position. The calibration processing then returns to step S301.

In step S308, if the reflected light has not been detected from both of the two spots S1 and S2 (No in step S308), then the user is told to reinstall the sensor unit 3 so that it is away from the projection region Aa (step S312). Upon receiving this notification, the user can reinstall the sensor unit 3 so that it is in the proper position. The calibration processing then returns to step S301.

The calibration processing for the installation position of the sensor unit 3 in the second embodiment is described above. In step S305 of the above-mentioned calibration processing, it can be determined whether or not the reflected light is detected from the spot S3, instead of the reflected light from the spot S4. In this case, it should go without saying that the processing in steps S306 and S307 is switched around. That is, in step S306 the user is told to reinstall the sensor unit 3 so that it faces away from the spot S3 (that is, clockwise in FIG. 14). Also, in step S307, the user is told to reinstall the sensor unit 3 so that it faces toward the spot S3 (that is, counterclockwise in FIG. 14).

In step S309 in the above-mentioned calibration processing, it can be determined whether or not the reflected light is detected from the spot S2, instead of the reflected light from the spot S1. In this case, it should go without saying that the processing in steps S310 and S311 is switched around. That is, in step S310 the user is told to reinstall the sensor unit 3 so that it faces away from the spot S2 (that is, clockwise in FIG. 14). Also, in step S311, the user is told to reinstall the sensor unit 3 so that it faces toward the spot S2 (that is, counterclockwise in FIG. 14).

As discussed above, with the projector 1 pertaining to the second embodiment, the projector unit 2 has the laser beam projector 21 that projects the scanning laser beam Ra, and the definition light emitter 25 that emits the definition light Rc for defining the projection region Aa.

This allows the position of the projection region Aa to be set within the detectable region of the photodetector 31 based on the notification light Rb (or the notification lines L) and the definition light Rc (or the spots S1 to S4) for defining the projection region Aa.

Third Embodiment

Figure 16:
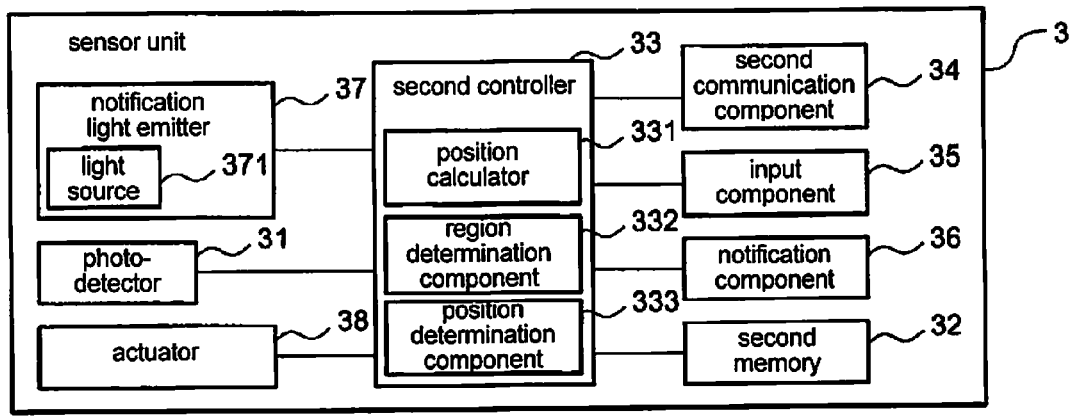
FIG. 16 is a block diagram of the configuration of a sensor unit of a projector in accordance with a third embodiment.

Referring now to FIG. 16, a sensor unit 3 in accordance with a third embodiment will now be explained. In view of the similarity between the first to third embodiments, the parts of the third embodiment that are identical to the parts of the first and second embodiments will be given the same reference numerals as the parts of the first and second embodiments. Moreover, the descriptions of the parts of the third embodiment that are identical to the parts of the first and second embodiments may be omitted for the sake of brevity.

In the third embodiment, the sensor unit 3 includes a mechanism for automatically adjusting the installation position and orientation of the sensor unit 3 based on the reflected light detection result produced by the photodetector 31. Everything else is the same as in the first or second embodiment. In the following discussion, components that are the same as in the first embodiment will be numbered the same and not described again.

FIG. 16 is a block diagram of the configuration of the sensor unit 3 pertaining to the third embodiment. As shown in FIG. 16, the sensor unit 3 further includes an actuator 38. The second controller 33 further has a position determination component 333. The position determination component 333 can be in the form of an electrical circuit, or can be a functional component of the second controller 33 realized by using the programs and control information held in the second memory 32.

The position determination component 333 determines the relative position of the projection region Aa with respect to the detectable region of the photodetector 31 based on the detection result for the reflected light from the projection surface F produced by the photodetector 31 (such as the reflected light for the scanning laser beam Ra and the definition light Rc). Furthermore, the position determination component 333 can calculate a position correction amount for the installation position and orientation of the sensor unit 3 in order to position the projection region Aa in the detectable region of the photodetector 31 based on this determination result. In this case, the position determination component 333 preferably calculates the position correction amount so that the bottom edge Ea1 of the projection region Aa will be substantially parallel to the top edge Eb2 within the virtual region Ab between the two notification lines L.

The actuator 38 is a driver that automatically adjusts the installation position and orientation of the sensor unit 3. The actuator 38 drives the sensor unit 3 in the x direction, the y direction, the z direction, and the rotation directions about axes along these directions, based on the determination result of the position determination component 333. For example, the actuator 38 drives the sensor unit 3 so that the projection region Aa will go into the detectable region, based on the relative position of the projection region Aa determined by the position determination component 333. Alternatively, it can drive the sensor unit 3 based on the position correction amount calculated by the position determination component 333. This eliminates the need for the user to reinstall the sensor unit 3 manually. Therefore, the installation position and orientation of the sensor unit 3 can be calibrated more easily. The actuator 38 can also drive the sensor unit 3 according to a user input operation received by the input component 35. Since the mechanical configuration of the actuator 38 can be conventional, detailed description of the actuator 38 will be omitted for the sake of brevity. However, the actuator 38 can be a device that moves the sensor unit 3 in the x direction, the y direction, the z direction, and the rotation directions about axes along these directions relative to the projection surface F.

In the third embodiment, the sensor unit 3 further has the position determination component 333 and the actuator 38. The position determination component 333 determines the relative position of the projection region Aa with respect to the detectable region, based on the detection result of the photodetector 31. The actuator 38 adjusts the installation position and orientation of the sensor unit 3 based on the determination result of the position determination component 333.

As a result, with the sensor unit 3, the installation position and orientation of the sensor unit 3 are adjusted by the actuator 38 based on the determination result of the position determination component 333. Therefore, the entire projection region Aa can be automatically set to within the detectable region even though the user does not reinstall the sensor unit 3 manually. Furthermore, the projection region Aa can be automatically set to within the detectable region even though the projection region Aa has deviated from the detectable region after the installation of the units 2 and 3.

Fourth Embodiment

Figure 17:
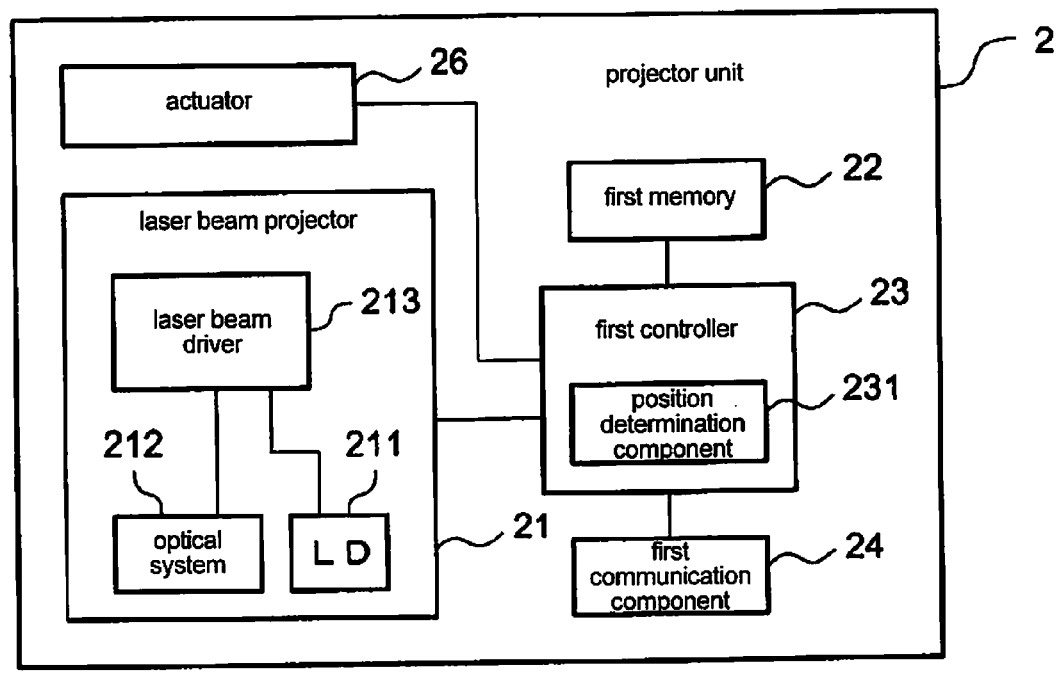
FIG. 17 is a block diagram of the configuration of a projector unit of a projector in accordance with a fourth embodiment.

Referring now to FIG. 17, a projector unit 2 in accordance with a fourth embodiment will now be explained. In view of the similarity between the first to fourth embodiments, the parts of the fourth embodiment that are identical to the parts of the first to third embodiments will be given the same reference numerals as the parts of the first to third embodiments. Moreover, the descriptions of the parts of the fourth embodiment that are identical to the parts of the first to third embodiments may be omitted for the sake of brevity.

In the fourth embodiment, the projector unit 2 includes a mechanism for automatically adjusting the installation position and orientation of the projector unit 2 based on the detection result of the photodetector 31. Also, the position of the projection region Aa with respect to the detectable region of the sensor unit 3 (not shown) is adjusted by adjusting the installation position and orientation of the projector unit 2. Everything else is the same as in the first or second embodiment. In the following discussion, components that are the same as in the first or second embodiment will be numbered the same and not described again.

FIG. 17 is a block diagram of the configuration of the projector unit 2 pertaining to the fourth embodiment. As shown in FIG. 17, the projector unit 2 further includes an actuator 26. In addition, the projector unit 2 can further includes the same definition light emitter 25 as in the second embodiment. Also, the first controller 23 has a position determination component 231. The position determination component 231 can be in the form of an electrical circuit, or can be a functional component of the first controller 23 realized by using the programs and control information held in the first memory 22.

The position determination component 231 determines the relative position of the projection region Aa with respect to the detectable region based on the detection result of the photodetector 31 received by the first communication component 24 from the sensor unit 3. Furthermore, the position determination component 231 can calculate a position correction amount for the installation position and orientation of the projector unit 2 in order to position the projection region Aa in the detectable region of the photodetector 31 based on this determination result. In this case, the position determination component 231 preferably calculates the position correction amount so that the bottom edge Ea1 of the projection region Aa will be substantially parallel to the top edge Eb2 within the virtual region Ab between the two notification lines L.

The actuator 26 is a driver that automatically adjusts the installation position and orientation of the projector unit 2. The actuator 26 drives the projector unit 2 in the x direction, the y direction, the z direction, and the rotation directions about axes along these directions, based on the determination result of the position determination component 231. For example, the actuator 26 drives the projector unit 2 so that the projection region Aa will go into the detectable region, based on the relative position of the projection region Aa determined by the position determination component 231. Alternatively, it can drive the projector unit 2 based on the position correction amount calculated by the position determination component 231. This eliminates the need for the user to reinstall the projector unit 2 manually. Therefore, the installation position and orientation of the projector unit 2 can be calibrated more easily. The actuator 26 can also drive the projector unit 2 according to a user input operation received by the input component 35. Since the mechanical configuration of the actuator 26 can be conventional, detailed description of the actuator 26 will be omitted for the sake of brevity. However, the actuator 26 can be a device that moves the projector unit 2 in the x direction, the y direction, the z direction, and the rotation directions about axes along these directions relative to the ceiling or the frame on which the projector unit 2 is installed.

In the fourth embodiment, the projector unit 2 further has the position determination component 231 and the actuator 26. The position determination component 231 determines the relative position of the projection region Aa with respect to the detectable region based on the detection result of the photodetector 31. The actuator 26 adjusts the installation position and orientation of the projector unit 2 based on the determination result of the position determination component 231.

As a result, with the projector unit 2, the installation position and orientation of the projector unit 2 are adjusted by the actuator 26 based on determination result of the position determination component 231. Therefore, the entire projection region Aa can be automatically set to within the detectable region even though the user does not manually reinstall the projector unit 2. Furthermore, the projection region Aa can be automatically set to within the detectable region even though the projection region Aa can be automatically set to within the detectable region even if the projection region Aa has deviated from the detectable region after the installation of the units 2 and 3.

In the fourth embodiment, the configuration is such that only the projector unit 2 includes the position determination component 231 and the actuator 26 (see FIG. 16). However, the configuration can also be such that the sensor unit 3 also includes the same position determination component 333 and the actuator 38 as in the third embodiment (see FIG. 15). As a result, the installation position and orientation of both the projector unit 2 and the sensor unit 3 can be automatically adjusted. Furthermore, at least one of the installation position and the orientation of the projector unit 2 and the sensor unit 3 can be adjusted.

Thus, in a modification example of the fourth embodiment, the projector unit 2 further has the position determination component 231 and the actuator 26. Also, the sensor unit 3 further has the position determination component 333 and the actuator 38. The position determination components 231 and 333 determine the relative position of the projection region Aa with respect to the detectable region based on the detection result of the photodetector 31. The actuator 26 adjusts at least one of the installation position and the orientation of the projector unit 2 based on the determination result of the position determination component 231. The actuator 38 adjusts at least one of the installation position and the orientation of the sensor unit 3 based on the determination result of the position determination component 333.

As a result, at least one of the installation position and the orientation of the projector unit 2 and the sensor unit 3 is adjusted by the actuators 26 and the actuator 38 based on the determination result of the position determination components 231 and 333. Therefore, the entire projection region Aa can be automatically set to within the detectable region even though the user does not manually reinstall the projector unit 2 and the sensor unit 3. Furthermore, the projection region Aa can be automatically set to within the detectable region even if the projection region Aa has deviated from the detectable region after the installation of the units 2 and 3.

The first to fourth embodiments of the present invention are described above, but it will be understood by a person skilled in the art that these embodiments are just examples, and various modifications to the combination of constituent elements and processing are possible and are within the scope of the present invention.

For example, in the first to fourth embodiments above, the sensor unit 3 projected the two notification lines L onto the projection surface F, but the applicable scope of the present invention is not limited to this example. Notification lines L indicating at least two opposing edges out of the outer edges of the virtual region Ab (such as the two notification lines L, or two notification lines corresponding to the bottom edge Eb1 and the top edge Eb2) can be projected. Alternatively, trapezoidal notification lines indicating the outer edges of the virtual region Ab can be projected.

Also, in the first to fourth embodiments above, the shape of the notification lines L is linear, but the applicable scope of the present invention is not limited to this example. There are no particular restrictions on the shape of the notification lines L, but they can be, for example, in the form of a broken line, a one-dot chain line, or a two-dot chain line, or they can be dotted lines with a plurality of spots arranged in a row. Furthermore, a projected image corresponding to the trapezoidal virtual region Ab can be projected by projection of the notification light Rb, instead of the notification lines L.

Also, in the first to fourth embodiments above, the two notification lines L are used to define the position of the bottom edge Ea1 of the projection region Aa, but the applicable scope of the present invention is not limited to this example. The two notification lines L can be used to define the position of the entire projection region Aa. Specifically, as long as all or part of the projection region Aa is within the virtual region Ab between the two notification lines L, the sensor unit 3 can be configured so that the reflected lights can be detected from the projection region Aa and from an object U located above this region.

Also, in the first to third embodiments above, the installation position and the orientation of the sensor unit 3 are calibrated, while in the fourth embodiment above, the installation position and the orientation of the projector unit 2 are calibrated. However, the applicable scope of the present invention is not limited to this example. The installation position and the orientation of at least one of the projector unit 2 and the sensor unit 3 can be calibrated. Furthermore, at least one of the installation position and the orientation of the projector unit 2 and the sensor unit 3 can be adjusted.

Furthermore, in the first to fourth embodiments above, if at least part of the projection region Aa is determined to be outside the detectable region, then the notification component 36 can provide a notification about a correction method for setting the projection region Aa to within the detectable region. In this case, the correction method is a method for correcting at least one of the installation position and the orientation of at least one of the projector unit 2 and the sensor unit 3. As a result, if it is determined that at least part of the projection region Aa is outside the detectable region of the photodetector 31, then the user can be notified of the correction method for setting the projection region Aa to within the detectable region. Therefore, the user can correct at least one of the installation position and the orientation of at least one of the projector unit 2 and the sensor unit 3 based on this correction method. Therefore, the user can easily set the entire projection region Aa to within the detectable region.

Also, in the first to fourth embodiments above, the projector unit 2 projects the scanning laser beam Ra with a wavelength in the visible light band toward the projection surface F. However, the applicable scope of the present invention is not limited to this example. A scanning laser beam Ra with a wavelength outside the visible light band (such as infrared light or ultraviolet light) can be projected instead.

Also, in the first to fourth embodiments above, the projector 1 is used as an example, but the applicable scope of the present invention is not limited to this example. The present invention can be applied to any electronic device that includes a detection device and a projection device that can be disposed independently and away from each other. For instance, it can be a device that detects the position of an object located above a certain region in which a photograph, picture, or the like has been placed or printed. In this case, the projection device projects specific light for defining as the projection region Aa a certain region in which a picture of a keyboard or the like has been placed or printed. The detection device detects the position of the object U based on reflected light from the object U located above this certain region.

In the illustrated embodiment, the electronic device in one aspect includes a projection unit configured to project light in a projection region on a projection surface, and a detection device disposed away from the projection unit. The detection unit has a photodetector that is configured to detect reflected light of the light from the projection unit within a detection region, and a notification light emitter that is configured to emit to the projection surface notification light for setting a position of the projection region to within the detection region of the photodetector.

With the above configuration, since the projection unit and the detection unit are disposed away from each other, the electronic device can be more compact. Limitations on the place where the electronic device is installed can also be relaxed. Also, since the projection unit can be disposed without being limited to the installation position of the detection unit, the projection region can be set to the desired size according to the relative position of the projection unit with respect to the projection surface. Furthermore, the projection region can be set within the detection region of the photodetector based on the notification light emitted from the notification light emitter. Therefore, even though the projection unit and the detection unit are disposed away from each other, the detection unit can detect the reflected light reflected after being projected from the projection unit.

Also, with the electronic device, the notification light emitter is configured to project as the notification light a projected image for setting within the detection region at least one of edges that is located closest to the detection unit among the edges of the projection region.

With this configuration, because at least the one of the edges that is located closest to the detection unit in the projection region is set based on the projected image of the notification light, the position of the projection region can be set within the detection region of the detection unit.

Also, with the electronic device, the projection unit includes a light projector that is configured to project the light, and a definition light emitter that is configured to emit definition light for defining the projection region.

With this configuration, the position of the projection region can be set within the detection region of the photodetector based on the notification light and the definition light for defining the projection region.

Also, with the electronic device, the detection unit further includes a region determination component that is configured to determine whether or not at least a part of the projection region is located outside the detection region based on a detection result of the photodetector.

Various kinds of reflected light, such as the definition light and the light projected from the projection unit in the projection region, are incident on the photodetector. Therefore, the region determination component can determine whether or not at least a part of the projection region is located outside the detection region based on the detection result of the photodetector that detects these kinds of reflected light.

Also, with the electronic device, the region determination component is configured to determine whether or not at least both end points of one of edges of the projection region that is located closest to the detection unit among the edges of the projection region are located within the detection region.

If the projection region is within the detection region of the photodetector, then at least the two ends of the one of the edges that is closest to the detection unit in the projection region will be within the detectable region. Also, in this case, the two ends of an edge farthest from the detection unit are usually also within the detectable region. Conversely, even if the two ends of the edge farthest from the detection unit are within the detectable region, there will be a probability that the two ends of the edge closest to the detection unit will not be within the detectable region. Therefore, by determining whether or not at least the both end points are within the detectable region, it can be determined easily and accurately whether or not the projection region is within the detectable region.

Also, with the electronic device, the detection unit further includes a notification component that is configured to issue a notification based on a determination result of the region determination component.

With this configuration, the user can be given various notifications related to the relation between the projection region and the detection region of the photodetector, based on the determination result of the region determination component.

Also, with the electronic device, when the region determination component determines that at least the part of the projection region is located outside the detection region, the notification component is configured to issue the notification about a correction method for setting the projection region within the detection region. The correction method includes a method for correcting at least one of the installation position and orientation of at least one of the projection unit and the detection unit.

With this configuration, when at least the part of the projection region is determined to be outside the detection region of the photodetector, the user can be notified of the correction method for setting the projection region to within the detectable region. Therefore, the user can correct at least one of the installation position and orientation of at least one of the projection unit and the detection unit based on this correction method. Therefore, the user can easily set the entire projection region to within the detection region.

Also, with the electronic device, at least one of the projection unit and the detection unit further includes a position determination component and a driver. The position determination component is configured to determine a relative position of the projection region with respect to the detection region based on a detection result of the photodetector. The driver is configured to adjust at least one of installation position and orientation of at least one of the projection unit and the detection unit based on a determination result of the position determination component.

With this configuration, at least one of the installation position and orientation of at least one of the projection unit and the detection unit is adjusted by the driver based on the determination result of the position determination component. Therefore, even if the user does not manually re-install the electronic device, the entire projection region can be automatically set to within the detection region by the driver. Furthermore, even if the projection region has deviated from the detection region after the installation of the electronic device, the projection region can be set to within the detection region automatically by the driver.

Also, with the electronic device, the projection unit is relatively movably arranged with respect to the detection unit.

Also, with the electronic device, the notification light emitter is configured to project as the notification light a projected image indicative of side edges of the detection region of the photodetector.

Also, with the electronic device, the definition light emitter is further configured to emit as the definition light a plurality of indicators corresponding to a plurality of corners of the projection region on the projection surface, respectively. The indicators are located outside the projection region.

The present invention provides an electronic device with which light reflected after being projected from a projection unit can be detected by a detection unit even though the projection unit and the detection unit are disposed away from each other.

In accordance with a first aspect, an electronic device comprises: a projection unit configured to project light in a projection region on a projection surface; and a detection unit disposed away from the projection unit. The detection unit includes a photodetector that is configured to detect reflected light of the light from the projection unit within a detection region, and a notification light emitter that is configured to emit to the projection surface notification light for setting a position of the projection region within the detection region of the photodetector.

In accordance with a second aspect, with the electronic device according to the first aspect, the notification light emitter is configured to project as the notification light a projected image for setting at least one of edges of the projection region that is located closest to the detection unit among the edges of the projection region within the detection region of the photodetector.

In accordance with a third aspect, with the electronic device according to the first aspect, the projection unit includes a light projector that is configured to project the light, and a definition light emitter that is configured to emit definition light for defining the projection region.

In accordance with a fourth aspect, with the electronic device according to the first aspect, the detection unit further includes a region determination component that is configured to determine whether or not at least a part of the projection region is located outside the detection region based on a detection result of the photodetector.

In accordance with a fifth aspect, with the electronic device according to the fourth aspect, the region determination component is configured to determine whether or not at least both end points of one of edges of the projection region that is located closest to the detection unit among the edges of the projection region are located within the detection region.

In accordance with a sixth aspect, with the electronic device according to the fourth aspect, the detection unit further includes a notification component that is configured to issue a notification based on a determination result of the region determination component.

In accordance with a seventh aspect, with the electronic device according to the sixth aspect, the notification component is configured to issue the notification about a correction method for setting the projection region within the detection region in response to the region determination component determining that at least the part of the projection region is located outside the detection region, with the correction method including a method for correcting at least one of installation position and orientation of at least one of the projection unit and the detection unit.

In accordance with an eighth aspect, with the electronic device according to the first aspect, at least one of the projection unit and the detection unit further including a position determination component that is configured to determine a relative position of the projection region with respect to the detection region based on a detection result of the photodetector; and a driver that is configured to adjusts at least one of installation position and orientation of the at least one of the projection unit and the detection unit based on a determination result of the position determination component.

In accordance with a ninth aspect, with the electronic device according to the first aspect, the projection unit is relatively movably arranged with respect to the detection unit.

In accordance with a tenth aspect, with the electronic device according to the first aspect, the notification light emitter is configured to project as the notification light a projected image indicative of side edges of the detection region of the photodetector.

In accordance with an eleventh aspect, with the electronic device according to the third aspect, the definition light emitter is further configured to emit as the definition light a plurality of indicators corresponding to a plurality of corners of the projection region on the projection surface, respectively, the indicators being located outside the projection region.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "forward", "rearward", "front", "rear", "up", "down", "above", "below", "upward", "downward", "top", "bottom", "side", "vertical", "horizontal", "perpendicular" and "transverse" as well as any other similar directional terms refer to those directions of an electronic device in an upright position. Accordingly, these directional terms, as utilized to describe the electronic device should be interpreted relative to an electronic device (or a sensor unit) in an upright position on a horizontal surface.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:
1. An electronic device comprising:
a photodetector that detects reflected light of light from a projection device within a detection region, the projection device projecting the light in a projection region on a projection surface;
a notification light emitter that emits on the projection surface two notification lines of visible wavelength that approach each other towards the photodetector; and
a controller that determines that the projection region is at least partially located outside the detection region based on a detection result of the photodetector,
the controller further determining that an edge of the projection region that is located closest to the photodetector is substantially parallel to a line segment that connects ends of the two notification lines.
2. The electronic device according to claim 1, wherein the two notification lines are indicative of a reference position of the projection region for setting the projection region within the detection region.
3. The electronic device according to claim 1, wherein the two notification lines are indicative of side edges of the detection region.

4. The electronic device according to claim 1, wherein the photodetector is arranged to set the edge of the projection region within the detection region.

5. The electronic device according to claim 1, wherein the controller determines that both ends of the edge of the projection region are located within the detection region.

6. The electronic device according to claim 1, further comprising
a notification component that issues a notification based on a determination result of the controller.

7. The electronic device according to claim 6, wherein the notification component issues the notification about a correction method for setting the projection region within the detection region in response to the controller determining that the projection region is at least partially located outside the detection region.

8. The electronic device according to claim 7, wherein the correction method includes a method for correcting at least one of installation position and orientation of at least one of the projection device and the electronic device.

9. The electronic device according to claim 1, wherein the controller determines a relative position of the projection region with respect to the detection region based on the detection result of the photodetector.

10. The electronic device according to claim 9, further comprising
a driver that adjusts at least one of installation position and orientation of the electronic device based on the relative position.

11. The electronic device according to claim 1, wherein the electronic device is relatively movably arranged with respect to the projection device.

12. The electronic device according to claim 1, wherein the projection device includes a light projector that projects the light, and a definition light emitter that emits definition light for defining the projection region.

13. The electronic device according to claim 12, wherein the definition light emitter emits as the definition light a plurality of indicators corresponding to a plurality of corners of the projection region on the projection surface, respectively, the indicators being located outside the projection region.

14. The electronic device according to claim 13, wherein the controller determines that a line segment that connects the indicators corresponding to both ends of the edge of the projection region is substantially parallel to the line segment that connects the ends of the two notification lines.

15. The electronic device according to claim 13, wherein the controller determines that the indicators corresponding to both ends of the edge of the projection region are located within the detection region.

16. The electronic device according to claim 13, further comprising
a notification component that issues a notification based on a determination result of the controller.

17. The electronic device according to claim 16, wherein the notification component issues the notification about a correction method for setting the projection region within the detection region in response to the controller determining that the projection region is at least partially located outside the detection region.

18. The electronic device according to claim 17, wherein the correction method includes a method for correcting at least one of installation position and orientation of at least one of the projection device and the electronic device.

19. The electronic device according to claim 13, wherein the controller determines a relative position of the projection region with respect to the detection region based on the detection result of the photodetector.

20. The electronic device according to claim 19, further comprising
a driver that adjusts at least one of installation position and orientation of the electronic device based on the relative position.

* * * * *